INVENTOR.
Harry O. Monson

Nov. 22, 1960
H. O. MONSON
2,961,393
POWER BREEDER REACTOR
Filed Nov. 18, 1957
11 Sheets-Sheet 6
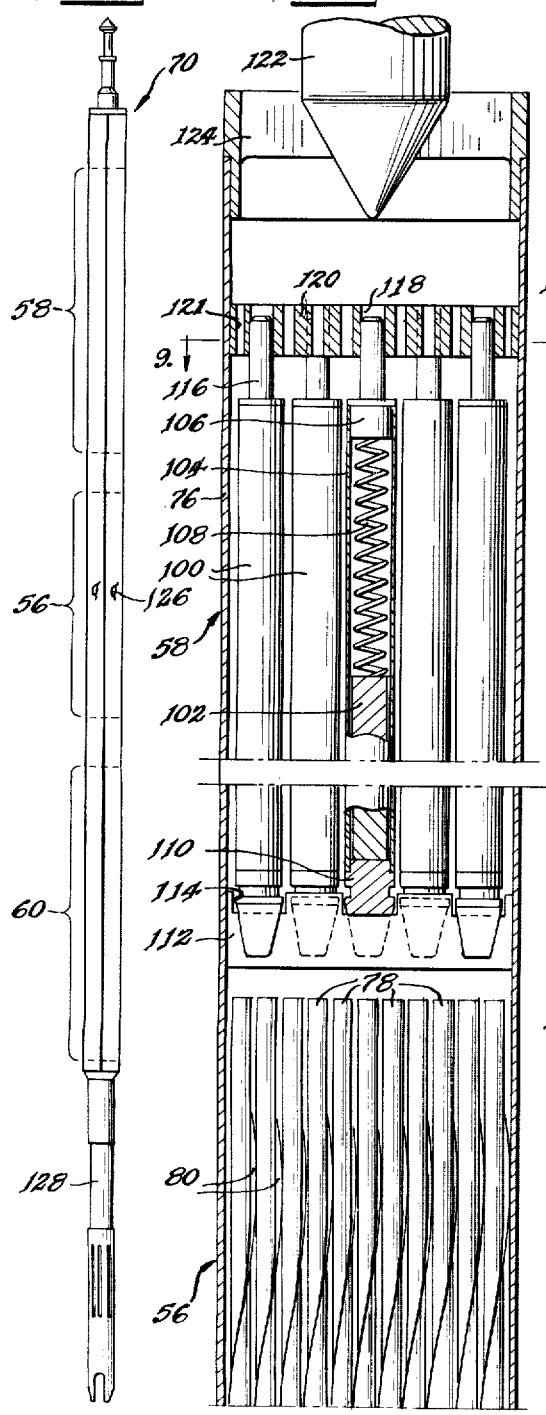
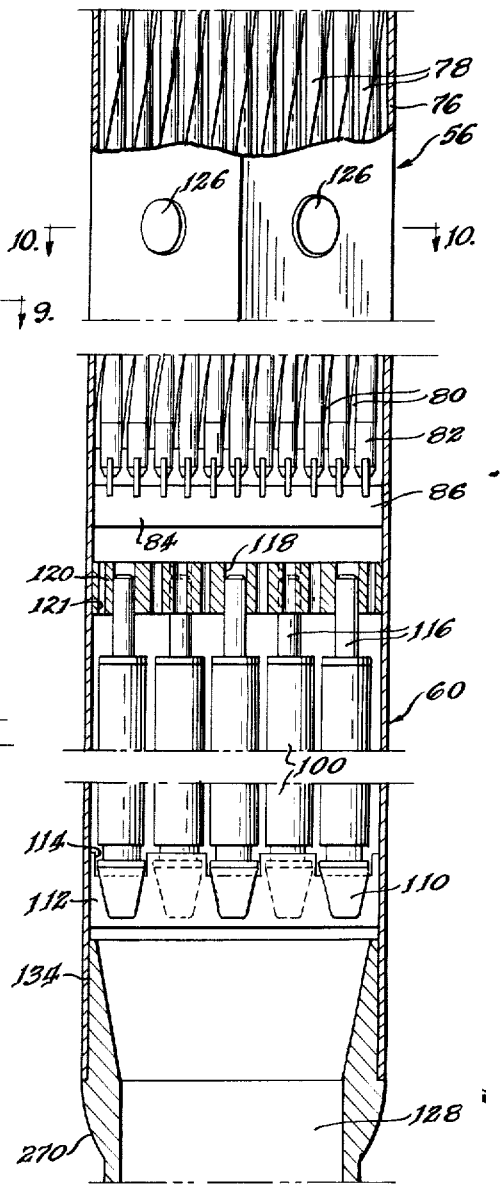
INVENTOR.
Harry O. Monson

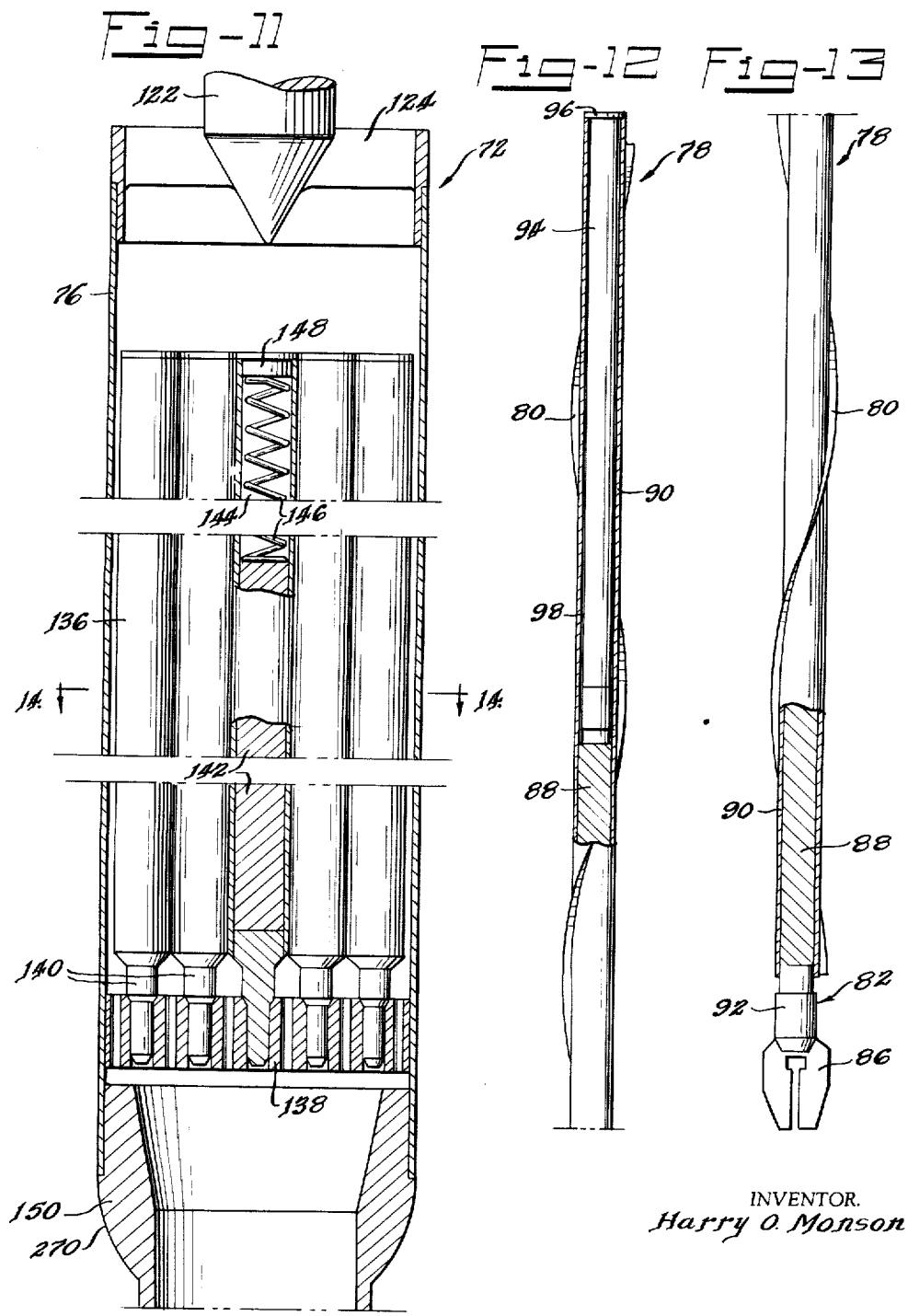

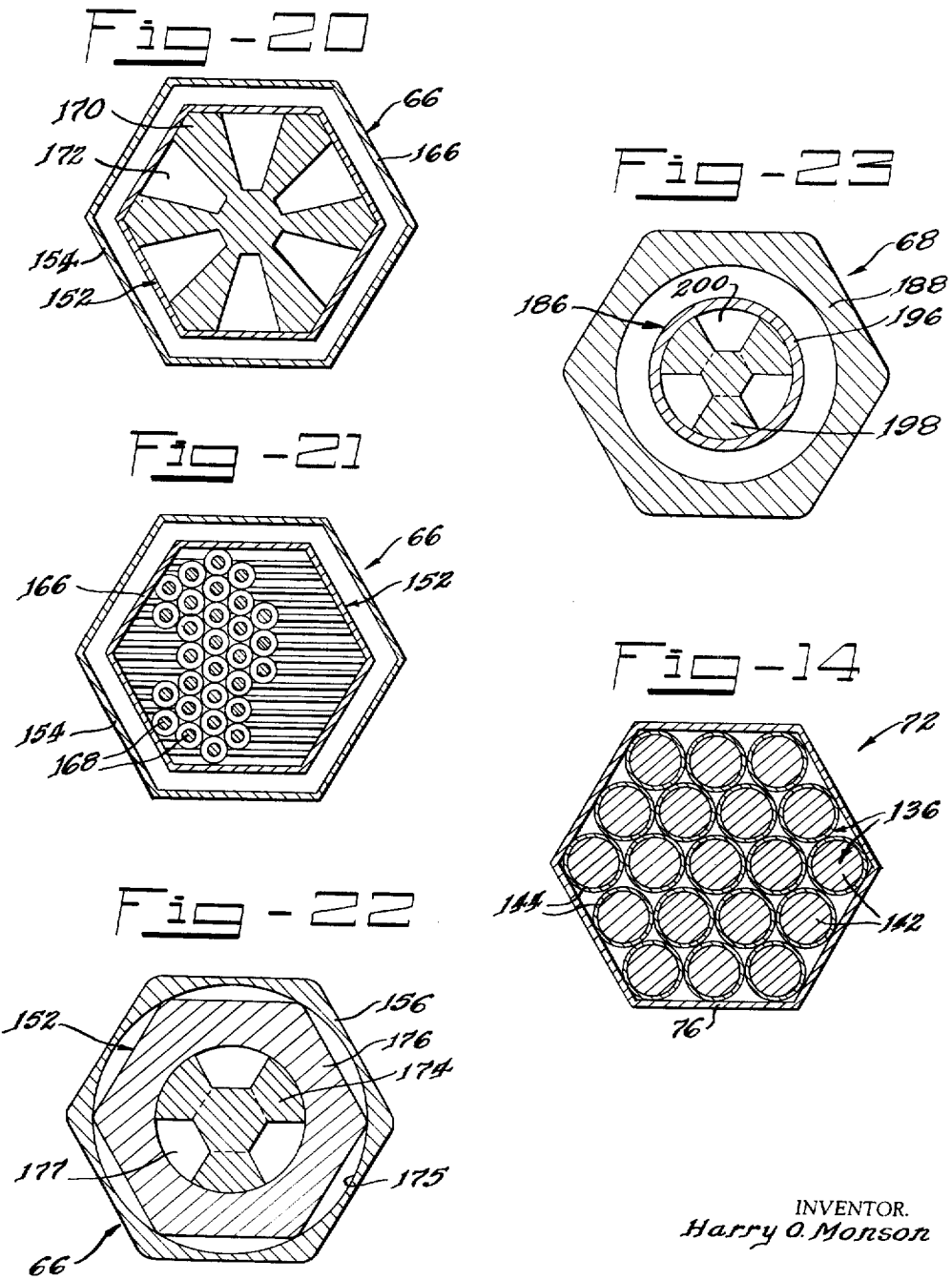

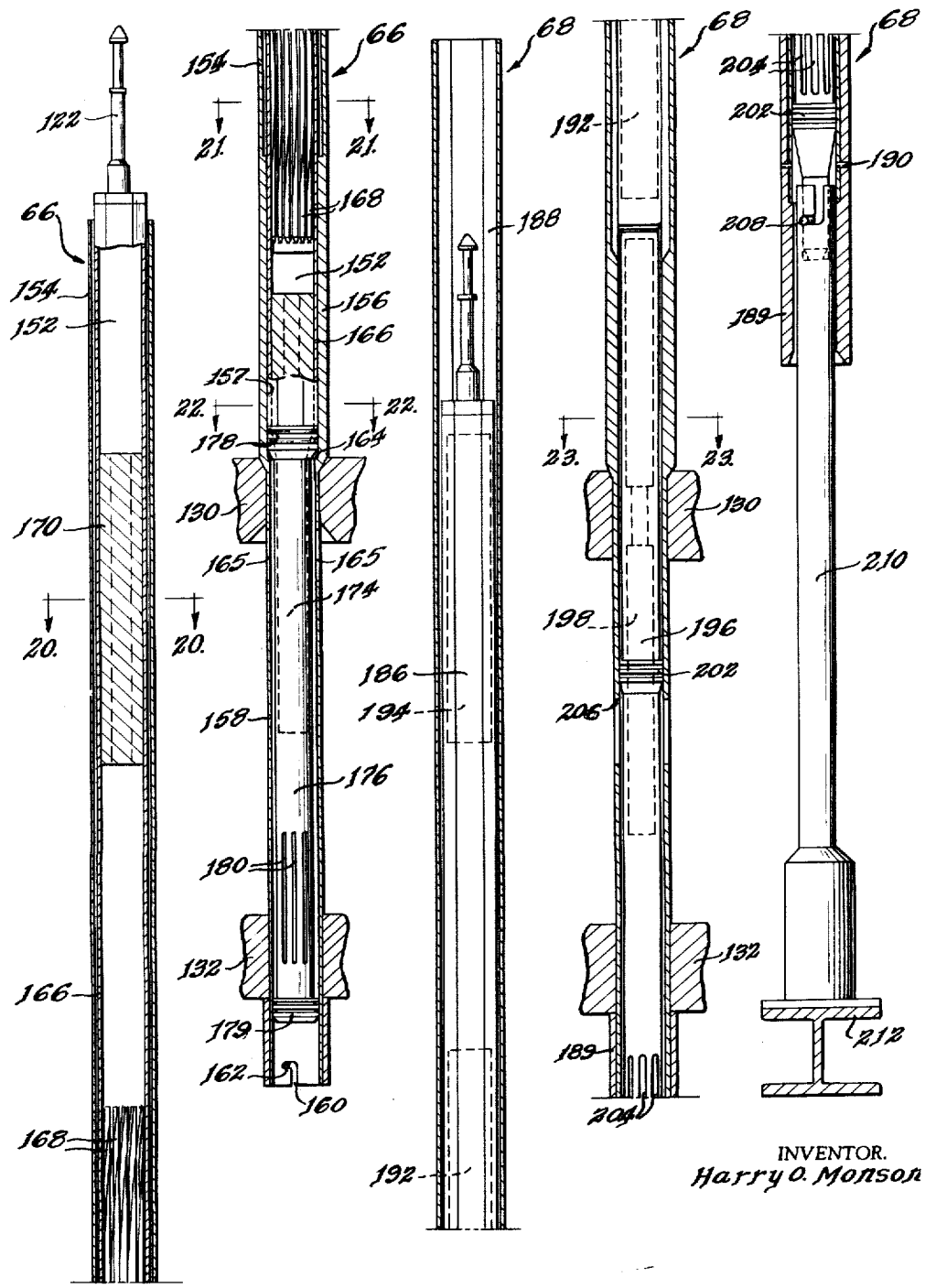

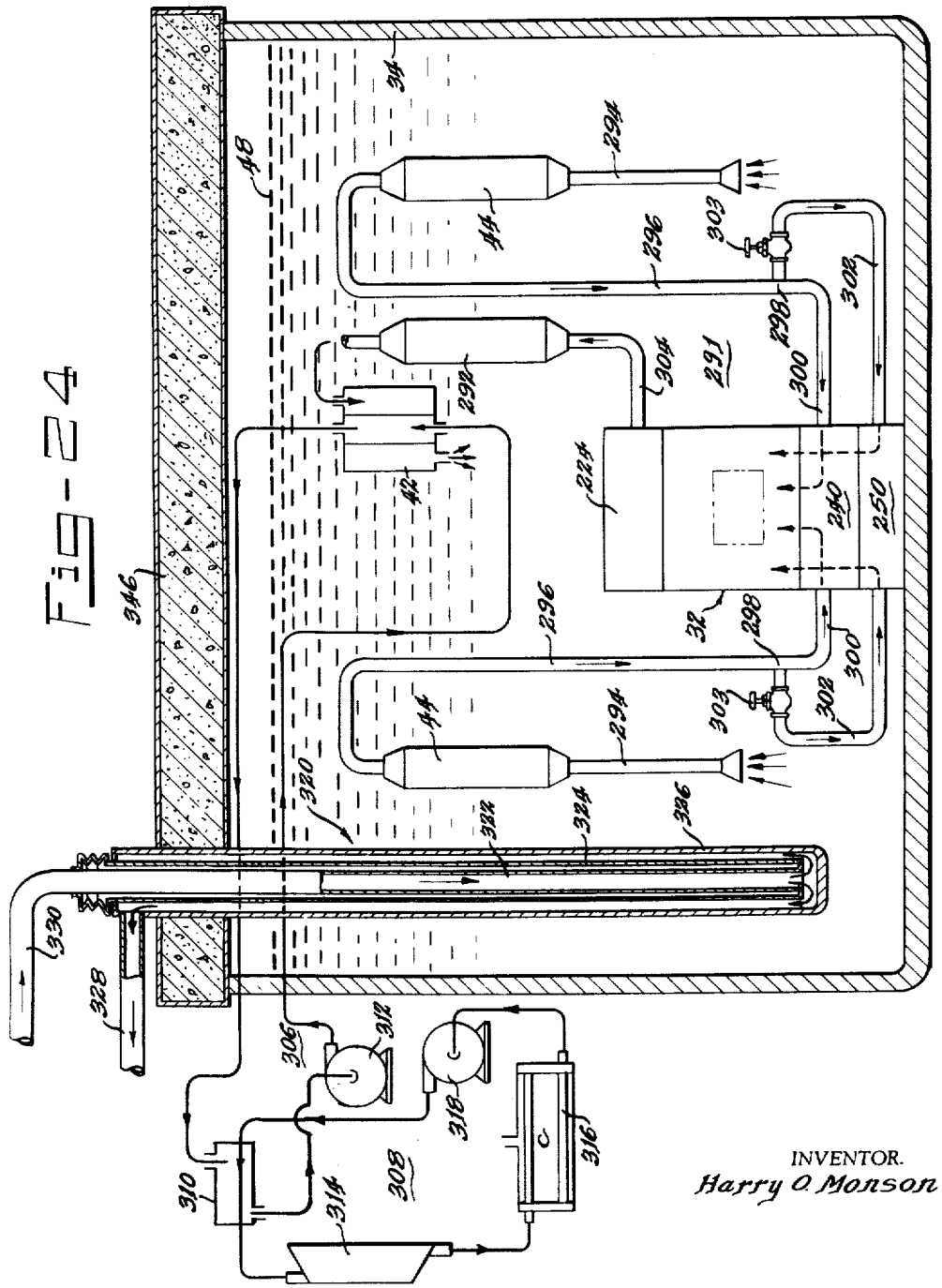

Nov. 22, 1960 — H. O. MONSON — 2,961,393
POWER BREEDER REACTOR
Filed Nov. 18, 1957 — 11 Sheets-Sheet 11

Bowing Of A Fifth Row Subassembly (With most pessimistic initial position)

Bowing Of A Fifth Row Subassembly (With most probable initial position)

INVENTOR.
Harry O. Monson

United States Patent Office 2,961,393
Patented Nov. 22, 1960

2,961,393

POWER BREEDER REACTOR

Harry O. Monson, Elmhurst, Ill., assignor to the United States of America as represented by the United States Atomic Energy Commission Filed Nov. 18, 1957, Ser. No. 697,295

6 Claims. (Cl. 204—193.2)

This invention relates generally to nuclear reactors and more specifically to nuclear reactors for producing power and also radioactive isotopes.

Nuclear reactors designed for the dual purpose of producing electrical power and radioactive isotopes are desirable for commercial exploitation. Power producing nuclear reactors which are designed to transform breeder materials into fissionable isotopes usable to refuel the reactor are especially desirable for commercial use. Their potential widespread use requires, of course, maximum effort to reduce potential hazards which may cause unsafe operation. Developments have been made in reactor engineering programs which are contributing to the final goal of virtually complete fail-safe operation of the nuclear power plants. These include automatic control systems, positive acting reactor shutdown systems and simple but effective primary and shutdown cooling systems such as disclosed in the co-pending application of Walter H. Zinn, Serial No. 437,017, filed June 15, 1954, now Patent No. 2,841,545.

There are hazards, however, which are not associated with the built-in control and safety check systems, but are related to the physical structure and particularly to the materials used and the operating conditions of the reactor. It is well known that the operation of a nuclear chain reaction is dependent upon the physical size of the reactor core with respect to the mass density of the fissionable material contained in the fuel elements comprising the active core. The reactivity of the core containing fissionable material having a given mass will vary if the shape and hence the volume of the core is altered. If a reactor core of given mass and volume is subjected to operating conditions which tend to alter the volume containing the given mass, the reactivity will necessarily increase or decrease as the case may be. Generally speaking, if the volume is caused to increase, the reactivity will drop, which may cause the multiplication factor of the reactor to decrease substantially below unity such that operation of the control devices will not be sufficient to maintain the reactor in operation. On the other hand, if the volume of the core is decreased, the reactivity will be caused to increase and the multiplication factor may reach such a value that the control and safety devices may not be adequate to avoid a continuing divergent reaction. A runaway condition may exist which could then result in a meltdown of the core fuel elements or possibly a disastrous explosion.

Operation of a fast neutron power breeder reactor, essentially of the design disclosed in the application of Walter H. Zinn, Serial No. 721,108, filed January 9, 1947, has indicated that reactive instability may occur in the core of a reactor due to the change in the mass volume ratio caused by temperature conditions present therein. The neutron flux density and, consequently, the heat generation in a reactor is known to be greatest in the central portion of the active core and lessens with the distance from the center of the core, the curve representing the neutron flux density or the heat generation versus distance from core center approximating that of a cosine function. The temperature differentials between different parts of the core cause stresses in the structural members making up the core and particularly in the fuel subassemblies containing the fissionable material. It will be noted that these stresses will be greater for increased operating powers since the core temperature differentials are positively related thereto. These stresses may result in the physical distortion and/or change of the spatial relationship of the fuel subassemblies with one another.

Many neutronic reactors have their active cores made up of a plurality of rod-shaped subassemblies containing fissionable material because of the relative simplicity of fabrication and handling of units of this shape. These subassemblies are generally cooled by passing a thermoconducting fluid around and/or through them. If a rod-shaped subassembly is subjected to conditions wherein one of its longitudinal sides is at a greater temperature than its opposite side, the subassembly will become distorted and tend to bow convexly in the direction of the greatest temperature. Since the highest temperatures occur in the most central region of the core, all of the fuel subassemblies will tend to bow in towards the central axis, thereby reducing the volume of the core, and increasing the reactivity. If the volume reduction is appreciable, the unstable conditions previously discussed will exist, which could result in a disastrous accident.

It is therefore an object of the invention to provide a reactor of the general type disclosed in the aforementioned application Serial No. 721,108 wherein reactivity changes with changes in operating power and temperature are minimized.

It is another object of this invention to provide a neutronic reactor which minimizes the effects of temperature differentials on the mass volume ratio of the core.

More particularly, it is an object of this invention to substantially eliminate any decrease in core volume which would result in increased reactivity.

It is also an object of this invention to reduce the temperature differentials within the active core of the reactor to minimize the bowing of the subassemblies.

Other objects and advantages of this invention will be self-evident upon further reading of this specification, especially when read in view of the accompanying drawings in which:

Fig. 6 is an elevation view of a reactor fuel subassembly;

Fig. 7 is an enlarged vertical sectional view of the upper part of the fuel subassembly shown in Fig. 6 illustrating the upper blanket section;

Fig. 8 is an enlarged vertical sectional view of the fuel subassembly shown in Fig. 6 illustrating the fuel section and lower blanket section;

Fig. 11 is an enlarged vertical sectional view of the active portion of a blanket subassembly;

Fig. 12 is an enlarged vertical sectional view, in part, of the upper part of one of the fuel elements disposed within the fuel portion of the fuel subassembly shown in Figs. 6, 7 and 8;

Fig. 13 is a vertical sectional view, in part, of the lower portion of one of the fuel elements disposed within a fuel subassembly;

Fig. 14 is a horizontal sectional view of a blanket subassembly taken on the line 14—14 of Fig. 11;

Fig. 15 is a vertical sectional view of the upper part of one of the control subassemblies disposed within the active portion of the reactor;

Fig. 16 is a vertical sectional view of the lower part of the control subassembly;

Fig. 17 is a vertical sectional view of the upper portion of one of the safety subassemblies disposed in the active portion of the reactor;

Fig. 18 is a vertical sectional view of the middle portion of a safety subassembly;

Fig. 19 is a vertical sectional view, in part, of the lower portion of the safety subassembly and illustrates the adapter connecting the safety rod to the safety rod operating means;

Fig. 20 is a horizontal sectional view of a control subassembly taken along the line 20—20 of Fig. 15;

Fig. 21 is a horizontal sectional view of a control subassembly taken along line 21—21 of Fig. 16;

Fig. 22 is a horizontal sectional view of a control subassembly taken along the line 22—22 of Fig. 16;

Fig. 23 is a horizontal sectional view of a safety subassembly taken along the line 23—23 of Fig. 18;

Fig. 24 is a schematic sectional view of the reactor submerged in its tank and shows the primary and shutdown cooling systems;

Figure 1:
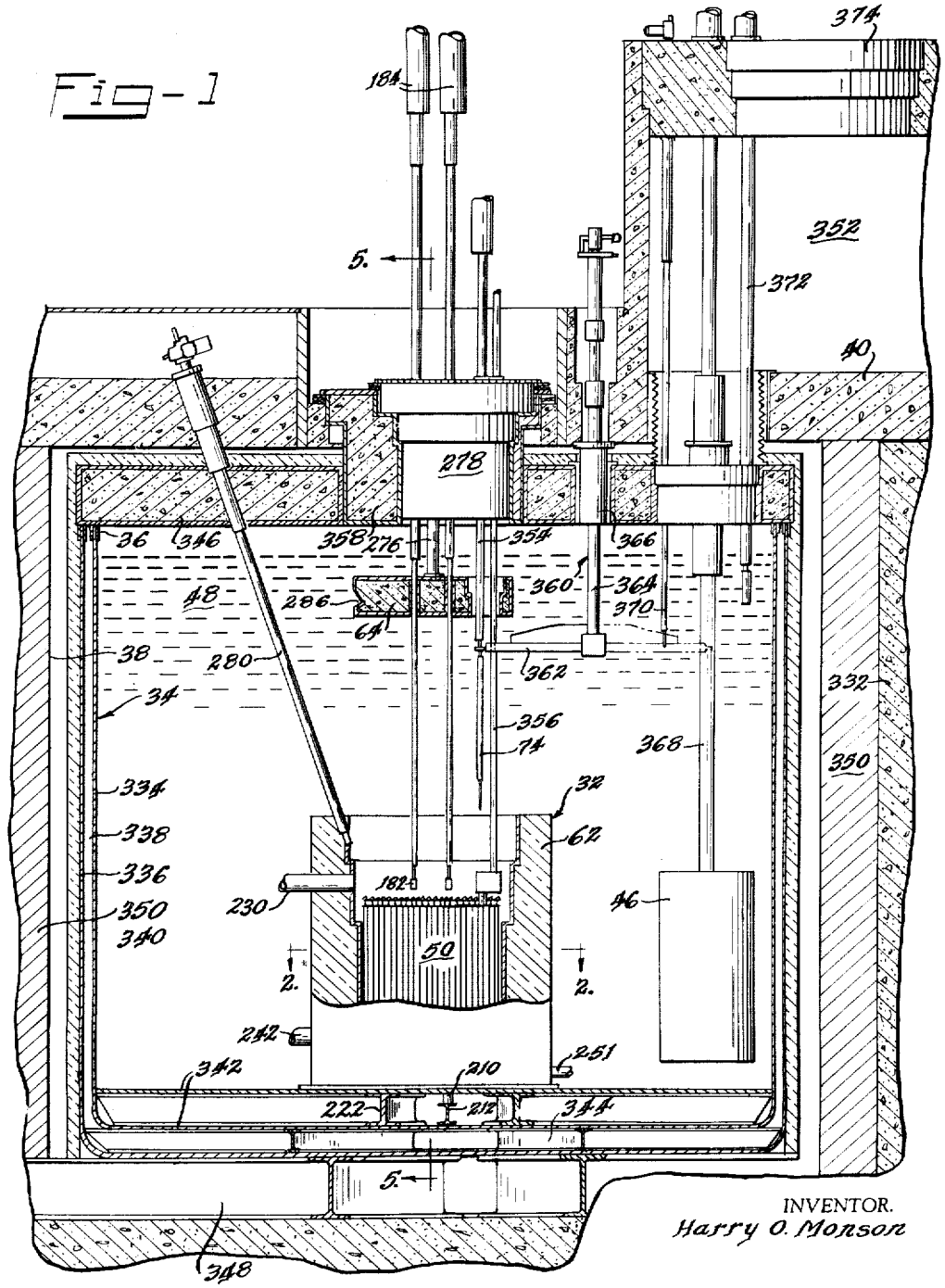
Fig. 1 is a vertical sectional view of the reactor submerged in its shielded tank and including the fuel handling mechanism and a separate fuel handling cell.

The term, nuclear reactor, in the present specification, is used to denote the shield, reflector and active portion of a chain reacting device. The term, nuclear reactor system, is used to designate the nuclear reactor, the primary cooling system including the reactor tank, the primary coolant heat exchanger, the primary coolant pump and the primary coolant.

It will be noted in the description that follows that the objects of the present invention are achieved in the described reactor comprising a core section and a radial blanket section, said core and blanket sections comprising vertically disposed multifaced assemblies, means for preventing lateral movement of each of said assemblies at its lower end, each face of each assembly having a protuberance in its vertical mid-portion which is adapted to engage a protuberance on the face of its adjacent assembly. A reaction with the structure herein described will not be appreciably affected by temperature differentials within the active portion because the lateral restraining means and the protuberances on the assembly faces control the shape distortions of the assemblies so that the volume of the core will remain appreciably the same with increased temperature differentials or will actually increase therewith. The reactivity of the reactor will therefore tend to remain constant or actually decrease with the increase in temperature differentials caused by increasing power level or other reasons.

REACTOR

The nuclear reactor described herein embodying the inventive subject matter is an unmoderated heterogeneous sodium cooled reactor and power plant with a power output of 62.5 megawatts of heat. The energy produced in the reactor is converted to 20 megawatts of electricity through a conventional steam cycle. The reactor is fueled with uranium-235 or plutonium and the plant includes an integral fuel processing facility where the irradiated fuel is processed, fabricated and assembled for return to the reactor.

The reactor 32 is contained in an imperforate tank 34 which has no openings or outlets below the rim 36 of the tank. The tank 34 is contained in a thick walled concrete reactor cell 38 which also has no openings below the ceiling 40 of the cell. The reactor tank 34 and concrete cell 38 will be described in detail later in the specification.

Figure 2:
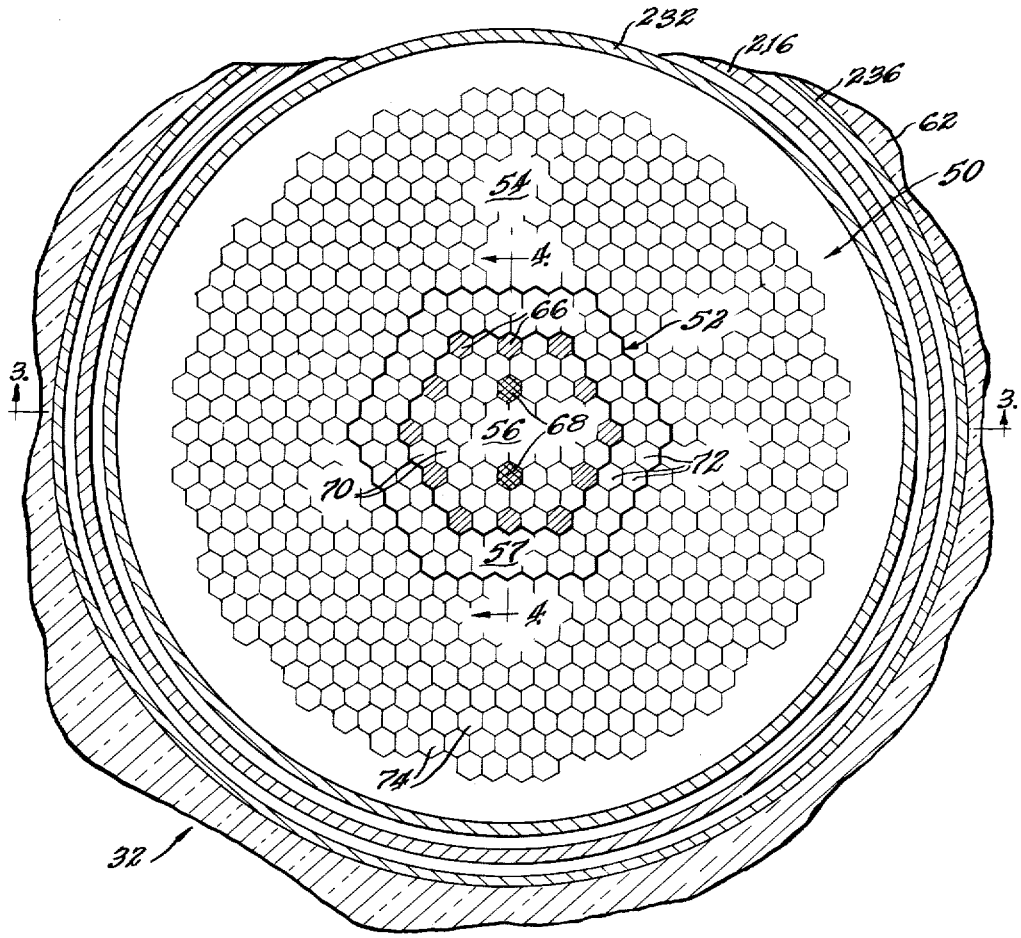
Fig. 2 is a horizontal sectional view of the active portion of the reactor taken along the line 2—2 of Fig. 1 showing the arrangement of the fuel, blanket, control and safety subassemblies.
Figure 3:
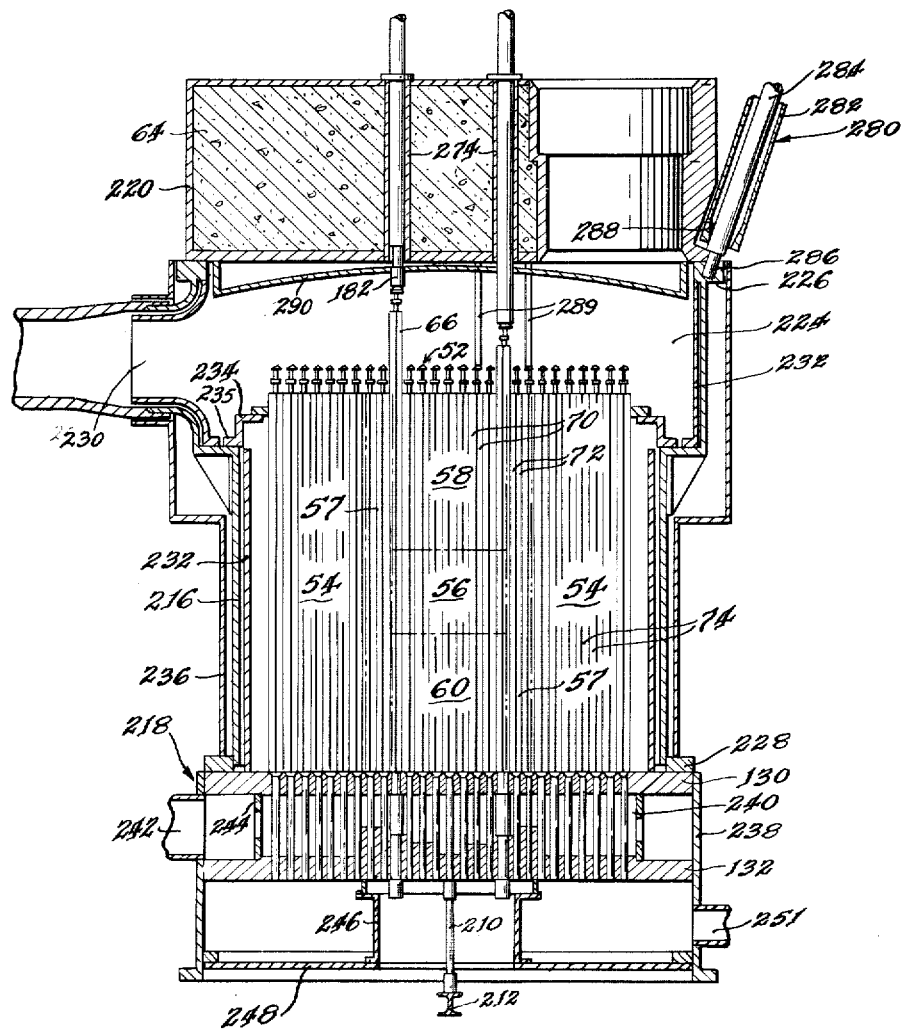
Fig. 3 is a vertical sectional view taken along the line 3—3 of Fig. 2 and shows the reactor of Fig. 1 in greater detail.

The reactor tank 34 contains not only the reactor itself, but, also, the primary heat exchanger 42, the primary coolant pump 44, and the fuel subassembly storage tank 46. See Figs. 1 and 24. The reactor tank 34 is substantially filled with the primary coolant 48, preferably sodium which completely immerses the reactor primary heat exchanger 42, primary coolant pump 44, and the fuel subassembly storage tank 46. As seen in Figs. 1, 2 and 3, the reactor has an active portion 50 comprising a core section 52 and a radial or outer blanket section 54. The core section 52 consists of a fuel region 56 and an inner blanket section 57 as well as an upper blanket section 58 and lower blanket section 60 as shown in Fig. 3. The active portion 50 of the reactor is disposed within a shield 62 which has a shield lid 64 covering the active portion 50. Twelve control subassemblies 66 are located at the outer edge of the fuel region 56 and two safety subassemblies 68 are located within the fuel region as shown in Fig. 2.

REACTOR ACTIVE PORTION

The active portion 50 of the reactor is best illustrated by Figs. 2 and 3 and contains a plurality of fuel subassemblies 70, inner blanket subassemblies 72, and outer blanket subassemblies 74, as well as the control and safety subassemblies 66 and 68 respectively, previously mentioned. The fuel and blanket subassemblies are right hexagonally shaped and measure 2.29 inches across flats of the hexagon. There are forty-seven fuel subassemblies 70, sixty-six inner blanket subassemblies 72, five hundred and ten outer blanket subassemblies 74, twelve control subassemblies 66 and two safety subassemblies 68, all being of identical external size. The construction of the subassemblies will be hereinafter described.

The subassemblies are spaced on a triangular pitch of 2.320 inches center distance. A nominal clearance of 0.030 inch exists between each subassembly to permit removal of the units from the reactor. The fuel region 56 including the control and safety subassemblies has an equivalent radius of 9.52 inches (24.17 centimeters) and a height of 14.22 inches (36.12 centimeters), total volume being 66.3 liters.

The fuel subassembly 70 (Figs. 6 through 10) is comprised of three "active" sections corresponding to the upper blanket 58, fuel section 56 and lower blanket 60 contained in a hexagonal tube 76 and said sections are numbered accordingly in the drawings. The fuel section 56 comprises ninety-one cylindrical fuel elements 78 spaced on a triangular lattice by a single helical rib 80 on the outside of each element 78. Each element 78 is supported within the subassembly at its lower end 82 by a support grid 84 made up of interconnected parallel strips 86 fitting transversely across the hexagonal tube 76 and welded thereto. The upper end of each fuel element is unrestrained to permit free axial expansion.

The fuel elements 78 (Figs. 12 and 13) are "pin type," each consisting of a right circular cylinder or pin 88 of fuel alloy fitted into a thin wall tube 90. The fuel pin 88 abuts an inverted U-shaped adapter 92 at the lower end 82 of the fuel element which engages the parallel plates 86 of the support grid 84. A hollow restrainer 94 fits into the upper part of the tube 90 and has a cap 96 which seals the tube. The fuel pin 88 is .144 inch in diameter by 14.22 inches long and is fabricated by precision casting direct to size of an "equilibrium fissium alloy" containing 49% enriched uranium hereinafter described. The tube 90 is fabricated of stainless steel .009 inch wall thickness by .174 inch O.D. and has a .049 inch diameter wire spirally wound around its periphery forming the helical rib 80. The restrainer is made of stainless steel and is 2.69 inches long with a diameter equal to that of the fuel pin. A .40 inch gap exists between the fuel pin and the restrainer which is filled with static sodium. The resultant annulus between the pin and the inside of the tube is also filled with static sodium to provide a thermal bond therebetween. The sodium bond extends a nominal 0.6 inch above the top of the fuel pin leaving a 2.35 inches inner gas space above the sodium to accommodate expansion of the sodium as well as expansion of the fuel upon radiation and fission product buildup.

The fissium alloy used for the fuel pins 88 is dependent upon the fission product yields based on infinite recycling of the reactor. Fissium is the name that has been applied to all those alloys of uranium, plutonium and fission products arising out of the work on pyro-metallurgical processing. Most of the processes in this category do not completely remove the metallic fission products and as a result the concentration of these elements increases with fuel recycle until an equilibrium value is reached. This equilibrium value is a function of the fission yield of the isotopes involved, half-life, cooling time, cross section and other processing losses. As a result there are many possible equilibrium alloys depending upon: the ratios of the fissionable materials, process operating conditions, reactor cycle, etc. Some of the variables are adjustable so that some control can be exercised over the composition of the recycle alloy.

The major fission products generated per cycle in uranium-235 irradiated to 2% burnup are as follows: Rubidium—0.021 w/o, strontium—0.072 w/o, yttrium—0.037 w/o, zirconium—0.23 w/o, niobium—0.013 w/o, molybdenum—0.18 w/o, technetium—0.052 w/o, ruthenium—0.14 w/o, rhodium—0.025 w/o, palladium—0.016 w/o, indium—0.001 w/o, tin—0.004 w/o, tellurium—0.024 w/o, iodine—0.012 w/o, xenon—0.25 w/o, krypton—0.027 w/o, cesium—0.22 w/o, barium—0.076 w/o, total rare earths—0.60 w/o, silver plus antimony plus cadmium—0.006 w/o. In general, the metal atoms (Mo, Ru, Rh, Pd) recycle with the fuel, and the non-metallic atoms are removed in processing, with zirconium, niobium and tellurium being partly removed. It is apparent that between pure uranium and the equilibrium fuel of infinite recycle there exists an infinite number of alloys. The problems introduced by starting a reactor cycle on pure uranium and then processing and fabricating a slightly different alloy at every pass are tremendous. As a result, the reactor is loaded with an alloy approaching one of the equilibrium alloys. The change in composition per pass in this case is slight and changes in properties are almost negligible. Thus the effects of the ingrowth of all fission products except technetium is alleviated but still leaves those problems arising from heavy element buildup. In view of the advantages of using equilibrium alloys the fuel pins 88 are preferably fabricated comprising the materials listed in Table I below in the weight percentages listed in the column designated Alloy A. It is to be understood that other alloys such as that listed under Alloy B in Table I may be equally as workable in view of the infinite number of alloys between the pure fissionable material and the equilibrium fuels of infinite recycle.

*Table I*

| Element | Alloy A | Alloy B |
|---|---|---|
| U (49% enrichment) | 95.0 | 69.2 |
| Pu | | 20.0 |
| Zr | 0.2 | 0.5 |
| Mo | 2.5 | 2.8 |
| Ru | 1.5 | 4.3 |
| Rh | 0.3 | 0.7 |
| Pd | 0.5 | 2.5 |

The upper and lower blanket sections 58 and 60, respectively in the fuel subassemblies 70, are identical in construction and each consists of nineteen pin type elements 100 also spaced on a triangular lattice. Each blanket element 100 comprises an unalloyed depleted uranium pin 102 (Fig. 7) containing 0.4 w/o U–235, and is .3165 inch in diameter by 18 inches long. The pin 102 is enclosed in a stainless steel tube 104 which is .376 inch in diameter and has a .022 inch wall thickness. A cap 106 seals the upper end of the blanket element 100 and is abutted by a spring 108 which holds the pin 102 in abutment with an adapter 110 sealing the lower end of the element. The adapter 110 engages a transversely located parallel plate grid 112 in slots 114 which serve to maintain the blanket elements 100 in their properly orientated positions. Each cap 106 has an upwardly extending spindle 116 which engages a properly aligned aperture 118 in the transversely disposed top grid structure 120. It will be noted in Fig. 9 of the drawing that the grid 120 is provided with apertures 121 for the flow of coolant. The annulus between the blanket pin 102 and the tube 104 is filled with static sodium to a level approximately .40 inch above the top of the pin 102.

At the upper end of the fuel subassembly 70 is a specially shaped adapter 122 which is fastened to the upper end of the hexagonal tube 76 by means of a multi-webbed spider 124. The adapter 122 is designed for use especially with a rod handling device of the type disclosed in Koch et al. Patent 2,924,483, dated February 9, 1960.

Each face of the hexagonal tube 76 contains a protuberance or button 126, ½ inch in diameter by 0.014 inch high which is formed by dimpling the tube wall. The buttons 126 are located 1.00 inch above the middle of the fuel region 56 formed by the fuel elements 78.

Figure 4:
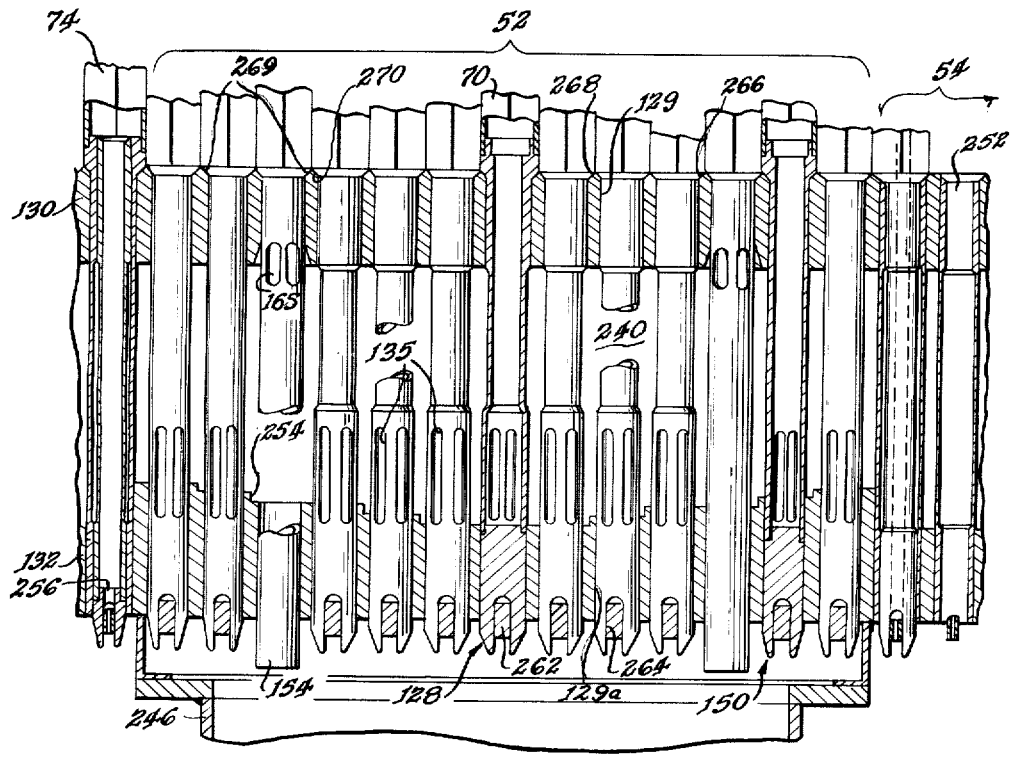
Fig. 4 is a vertical sectional view taken along the line 4—4 of Fig. 2 and shows the lower extensions of the fuel and blanket subassemblies in detail.
Figure 9:
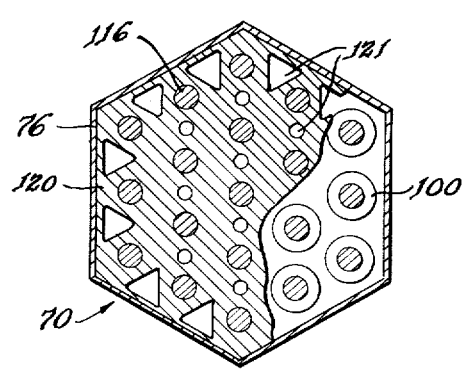
Fig. 9 is a horizontal sectional view of the upper blanket portion of the fuel subassembly taken along the line 9—9 of Fig. 7.
Figure 10:
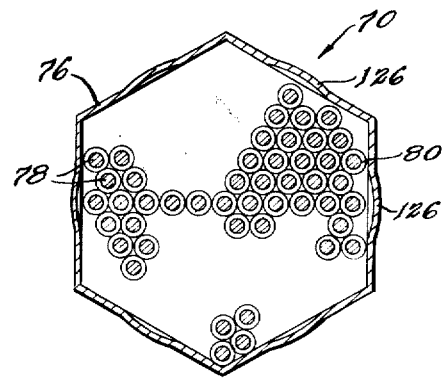
Fig. 10 is a horizontal sectional view of the fuel portion of the fuel subassembly taken along the line 10—10 of Fig. 8.

At the bottom end of the fuel subassembly 70 is a plenum adapter 128 designed to engage confronting apertures 129 and 129a in the upper and lower grid plates 130 and 132, respectively, disposed transversely across the bottom portion of the reactor as seen in Figs. 3 and 4. The adapter 128 is a hollow member which has a recessed portion 134 at its upper end which fits into the hexagonal tube 76 and is welded thereto. The adapter 128 has slots 135 through which coolant may flow into the interior of the fuel subassemblies 70. Further details of the construction of the adapter 128 will be given later in this description in relation with the upper and lower grid plates 130 and 132.

The inner blanket subassembly 72 shown in Figs. 11 and 14 comprises a hexagonal tube 76, a handling device adapter 122 and connecting spider 124 identical to those described for the fuel subassemblies 70 and hence are numbered accordingly. Within the inner blanket subassembly 72 are nineteen cylindrical blanket elements 136 spaced on a triangular pitch by means of grid 138 into which fit the lower end adapters 140 of the blanket elements 136. The grid 138 has a number of circular and triangular apertures for the passage of coolant through the interior of the subassembly the same as the grid 112 supporting the upper end of the blanket elements 100 in the fuel subassemblies 70, previously described.

The blanket elements 136 each comprise a right circular pin 142, 0.433 inch in diameter, totaling 55 inches in length and containing depleted uranium of 0.4% U-235. The pin 142 is housed in a stainless steel tube 0.493 inch O.D. with a 0.018 inch wall thickness, the resultant 0.012 inch annulus being filled with static sodium to provide a thermal bond. The sodium extends a nominal 2 inches above the top of the uranium with a 4 inch argon gas expansion region above the sodium. This region also provides for fuel expansion upon radiation and sodium expansion as well as fission product gas buildup. A spring 146 abuts the blanket pin 142 and a welded plug 148 to keep the pin 142 secure. No restraining means are used at the upper end of the blanket elements 136 so that they are free to expand axially when the temperature within the reactor is increased. The lower plenum adapter 150 of the blanket subassembly 72, which fits into the confronting apertures 129 and 129a of the upper and lower grid plates, is similar to, but smaller in diameter than that for the fuel subassembly, the detailed description of which will be hereinafter described.

The outer blanket subassembly 74 is identical to the inner blanket subassembly except for the design of the lower adapter which will be described later with respect to the upper and lower grid plates.

CONTROL SUBASSEMBLIES

The control subassembly 66 consists of a control rod 152 and a guide thimble 154 as shown in Figs. 15, 16 and 20 through 22. The guide thimble is a stainless steel hexagonal tube having, for the most part, the same dimensions as the fuel and blanket tubes 78 and 102 respectively. Each thimble therefore occupies a unit lattice space identical to that occupied by each of the various subassemblies, their dispersal around the periphery of the fuel region 56 being illustrated in Fig. 2. The guide thimble 154 is 2.290 inches across opposite flats with a .040 inch wall thickness in the portion which is within the active portion 50 of the reactor except for the lower portion therein designated 156 which has a circular internal cross section which serves as a guide bearing surface for the control rod 152 as hereinafter described. The lower end 158 of the guide thimble is also circular in cross section, extending through the confronting apertures 129 and 129a below the lower grid plate 132, and has an L-shaped slot 160 which engages a pin 162 to lock the guide thimble 154 in position. The guide thimble may only be removed from the reactor by rotating same after removing the six adjacent fuel and blanket subassemblies. A seat 164 is located within the guide thimble 154 at the level of the top surface of the upper grid plate 130 which serves to restrict the downward movement of the control rod 152. Slots 165 (Fig. 4) are provided in the guide thimble adjacent the lower surface of the upper grid plate 130 to permit the flow of coolant into the thimble.

The control rod 152 comprises in a stainless steel hexagonal tube 166 which is 1.908 inches across flats. Within the tube 166 are sixty-one cylindrical fuel elements 168 which are identical to those employed in the fuel subassemblies 70. Above the fuel elements 168 and spaced therefrom is a solid steel reflector section 170 having radial slots 172 for the passage of coolant (Fig. 20). The reflector section 170 measures 12 inches in length and is spaced 15¾ inches above the fuel elements 168. Immediately below the fuel elements 168 is a 19½ inch long solid steel lower reflector section 174. The lower reflector fits into a circular passage 175 formed in the hexagonally shaped control rod lower adapter 176. The lower reflector 174 has coolant passages 177 as shown in Fig. 22 of the drawings.

Spaced guide bearings 178 and 179 (Fig. 16) are formed around the adapter 176 of the control rod and cooperate with the bearing surface 157 to prevent coolant from flowing in the interstice between the guide thimble 154 and the control rod 152, and also provide a guide for control rod movement within the guide thimble. Slots 180 are located adjacent the lower end of the control rod for the passage of coolant to the interior of the control rod.

Since the vertical position of the control rod in the reactor is variable, the heat generation within the control rod is also variable. The coolant flow through the control rod must necessarily be established for the maximum heat generation, i.e. with the control rod fully inserted in the reactor. If a constant coolant flow is employed the temperature rise in the coolant decreases as the control rod is lowered out of the reactor. This results in considerable degradation of the outlet sodium temperature from the reactor. The arrangement of the control rod annd guide thimble coolant inlet slots 180 and 165, respectively, permits the use of variable orificing proportional to the position of the control rod in the reactor. It will be noted that the vertical displacement of the control rod within the guide thimble is limited so that the slots 165 in the thimble guide are above the lower bearing 179 of the control rod throughout the control rod travel. The lower end of the guide thimble 154 is open; however the lower control rod bearing 179 serves as a flow restriction to prevent sodium leakage from the bottom of the thimble.

The upper end of the control rod 152 is fitted with a fuel handling adapter 122 which is identical to the one used in the fuel subassemblies 70. The control rod adapters 122 are engageable by control rod actuators 182 (Fig. 1) which extend into the reactor 32 through the top of the concrete cell 38 and are driven by the driving mechanisms 184. There are twelve control rod actuators and driving mechanisms, one for each control rod. The actuators and driving mechanisms for each of the twelve control rods are identical and are so arranged that only one drive may be operated at a time with the exception of a scram condition when all twelve operate simultaneously. The driving mechanism comprises a constant speed motor capable of driving the rods at a vertical rate of 5 inches per minute in either direction and is instantaneously reversible. The driving mechanism also comprises an air cylinder so that the actuator is constantly working against a compressed air pressure of approximately 50 p.s.i.g. when the rod is being raised. When a scram signal is received the compressed air will drive the control rod down to remove the fuel elements 168 from the fuel region 56 of the reactor.

SAFETY SUBASSEMBLIES

The safety subassemblies 68 each consist of a safety rod 186 and a guide thimble 188 as shown in Figs. 17 through 19 and 23. The safety rod and thimble are almost identical to the control subassembly hereinbefore described except for modifications at the lower end. Two safety subassemblies are incorporated in the reactor and are located within the fuel region as shown in Fig. 2. The safety rods are not a part of the normal operational control system and are fully inserted in the reactor (in their most reactive position) at all times during operation and shutdown. The purpose of the safety rods is to provide available negative reactivity during operations when the reactor is shut down and the control rods are disconnected from their drives. Their primary purpose is to provide a safety device during reactor loading and unloading operations.

The safety rod guide thimble 188 is a hexagonal tube 2.290 inches across flats which extends below the lower grid plate 132 and is held in place within a tubular extension 189 below the lower support grid 132 by means of an L slot and pin 190. The safety rod 186 comprises a hexagonal tube measuring 1.908 inches across flats with a .040 inch wall thickness and sixty-one fuel elements 192 which are identical to those used in the fuel subassemblies 70. Spaced above the fuel elements 192, a distance of 12½ inches, is an upper reflector section 194 which is identical to the upper reflector section 170 used in the control rod 152. The lower end 196 of the safety rod is circular in cross section and contains the lower reflector section 198 which has passages 200 for the flow of coolant as shown in Fig. 23. Spaced guide bearings 202 are disposed near the lower end of the safety rod to prevent coolant flow therebeyond and also to serve as guides for the movement of the safety rods within the guide thimbles. Slots 204 are provided adjacent the lower end for the passage of coolant into the interior of the safety rods. The slots 204 are positioned adjacent slots 206 located in the guide thimble between the upper and lower grid plates 130 and 132 when the safety rod is in its normal inserted position. It will be noted that Figs. 17 through 19 show the safety rod in its extracted position. The safety rod has a vertical stroke of 14 inches at the top of which the fuel elements 192 are positioned within the fuel region 56.

Figure 5:
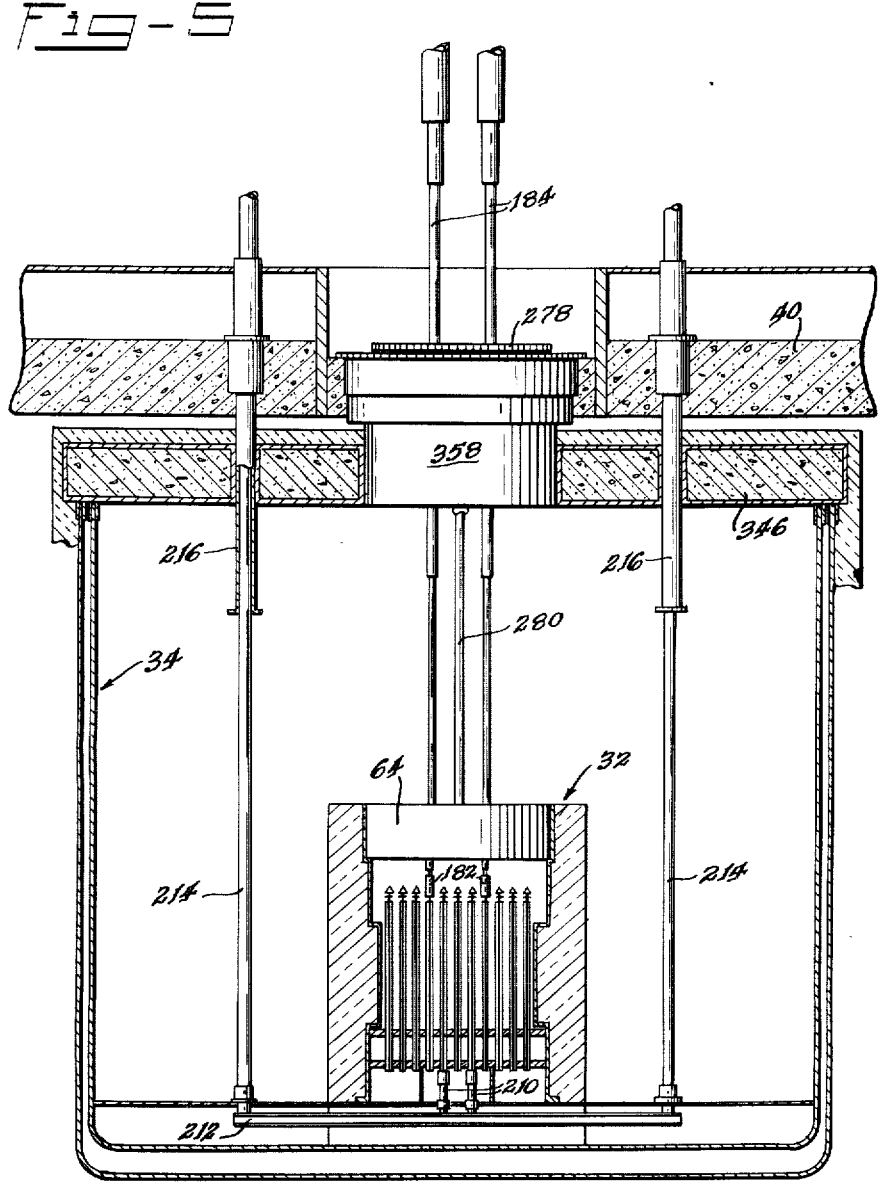
Fig. 5 is a vertical sectional view taken along the line 5—5 of Fig. 1 and shows the arrangement of the safety rod operating means.

The safety rod 136 is connected at its lower end by means of a pin and L slot 208 to a shaft 210 which extends below the reactor 36 and is fastened to an I beam 212 (Figs. 5 and 19). The I beam is connected at its ends to shafts 214 which extend upward through seals 216 in the top of the reactor cell 38. The safety rods are maintained in their raised position by means of a mechanism (not shown) which is connected to the shafts 214. In the event of a scram condition during loading and unloading operations the mechanism releases the rods 214, and the I beam with its connected safety rods falls by the force of gravity to remove the fuel elements 192 from the fuel region 56 of the reactor.

REACTOR VESSEL ASSEMBLY

The reactor vessel assembly consists of the reactor vessel 216, the grid plenum assembly 218 and the top cover 220 as shown in Fig. 3. It contains the fuel and blanket subassemblies and control and safety subassemblies, providing for the proper orientation of these units. The assembly is located and supported at the bottom and on the center line of the tank 34 and is supported on the crossed structural members 222 which reinforce the bottom of the tank 34 (Fig. 1). The reactor vessel 216 is essentially a right circular cylinder having an enlarged upper portion or plenum 224, and flanges 226 and 228 at its upper and lower ends, respectively. The vessel 216 is bolted to the grid plenum assembly 218 by means of bolts (not shown) through the lower flange 228 and the upper grid plate 130. The reactor vessel including the upper plenum 224 and coolant outlet 230 is lined with a thermal baffle 232 the function of which is to lower the temperature difference across the vessel wall and the coolant outlet wall. A retainer ring 234 is fastened to the shoulder 235 of the vessel 216 and serves to hold the upper end of the blanket and fuel subassemblies in proper orientation. The vessel wall 216 is insulated from the bulk sodium 48 in which it is submerged by a shell 236 which is vented so as to contain static sodium between the shell 236 and the vessel 216. Both the thermal baffle 232 and the shell 236 are fabricated of steel.

GRID PLENUM ASSEMBLY

The grid plenum assembly 218 comprises the 4-inch thick stainless steel spaced upper and lower grid plates 130 and 132, respectively, which are welded to the inside of the circular cylindrical wall 238 forming the high pressure coolant inlet plenum 240 between the grid plates. The high pressure coolant enters the plenum 240 through the coolant inlet 242 and is distributed with the aid of a coolant baffle 244. A cylindrical baffle 246 is located between the lower grid plate 132 and the bottom plate 248 of the reactor vessel and forms the low pressure coolant inlet plenum 250 with the cylindrical wall 238. Numeral 251 indicates the low pressure coolant inlet.

The grid plenum chamber arrangement may best be seen in Fig. 4 of the drawings. The upper and lower grid plates 130 and 132 are interconnected by tubes 252 welded to each plate within the confronting apertures 129 and 129a in the radial blanket zone 54. The tubes 252 provide the structural system required to support the entire reactor load on the upper plate, as well as prevent short circuiting of coolant between the high pressure plenum 240 and the low pressure plenum 250 to which the lower ends of the tubes are connected. The high pressure coolant flows between these tubes into the core section 52 within the grid plenum where it enters the fuel and inner blanket subassemblies through the slots 135 and is forced upward therein. The lower end of each of the core and inner blanket subassembly adapters 128 and 150 is closed forming a hydraulic piston. The coolant in the high pressure coolant planum chamber is at a pressure of approximately 55 p.s.i.g. and this pressure acts across the closed end providing a downward force of approximately 150 pounds on each fuel subassembly 70 and approximately 120 pounds on each inner blanket subassemblies 72.

It will be noted that the upper surface 254 of the lower grid plate 132 is stepped in such a manner as to vary the cross sectional area of the slots 135 in the fuel and inner blanket subassemblies 70 and 72 respectively. This provides orificing of the flow of coolant through the subassemblies to match the heat generation rate which is greater at the center axis of the reactor and diminishes as the distance therefrom increases.

The low pressure coolant enters the low pressure plenum chamber 250 at 20 p.s.i.g. and is introduced into the outer blanket subassemblies 74 through the openings 256 at the bottom of the lower adapter 150. Because the pressure dropped through the outer blanket subassemblies is much smaller and the weight of these units is larger, it is unnecessary to provide hydraulic holddown as is employed in the fuel and inner blanket subassemblies.

The reactor herein described is designed to be loaded and unloaded by remote control operations. Consequently it is necessary to provide a system whereby the several types of subassemblies cannot be interchanged in their positions in the active portion. All subassemblies in the active portion are, of course, supported by the confronting apertures 129 and 129a in the upper and lower grid plates, respectively. However, three different hole diameters are employed in the grid plates, i.e. the fuel subassemblies 70 fit into the largest diameter hole, the inner blanket subassemblies 72 fit into smaller diameter holes and the outer blanket subassemblies 74 fit into the smallest diameter holes. This prevents a fuel subassembly from being placed inadvertently in an inner blanket position or an outer blanket position and likewise an inner blanket subassembly cannot be placed in an outer blanket position. To prevent the interchange of subassemblies in the other direction, subassembly orientation bars 262 are used. These bars are fastened to the underside of the lower grid plate 132 across the apertures 129a and engage slots 264 in the subassembly adapters. There are three thicknesses of bars; the fuel subassemblies engage the thickest, the inner subassembly slots are thinner and the outer blanket subassembly slots are the thinnest. If an inner blanket subassembly is inadvertently placed in a fuel position, the slot in the inner blanket assembly tip is too narrow to allow the slot to engage the bar. This prevents engagement of the subassembly at least 2 inches short of its normal position in the grid which is easily detected. This same condition exists if an outer blanket subassembly is placed in an inner blanket position or a fuel position. The orientation bars 262 also provide proper angular orientation of the subassembles during loading.

This arrangement of loading control was adopted because a fuel subassembly inserted in either blanket zone introduces both a reactivity problem and a cooling problem, while a blanket subassembly introduced in the wrong zone introduces only a cooling problem. The lower grid plate 132 is located 19 inches below the upper grid plate 130 while the fuel elements within the fuel assembly are only 14 inches long, approximately. If a fuel subassembly cannot enter the grid aperture when placed in the wrong location, the fuel section of the subassembly will not enter the fuel region. In the reverse manner, a subassembly can engage the grid for approximately 17 inches of travel but an error is detectable because the orientation bar will not permit the last 2 inches travel.

The fuel and blanket subassemblies are vertically supported by the shoulder and seat arrangement 266 on the upper side 268 of the upper grid plate 130. Each aperture 129 in the upper grid plate 130 has a conical chamfer 269 which engages a spherical surfaced shoulder 270 on the subassemblies as shown in Figs. 8 and 11. This arrangement minimizes the leakage flow of coolant along the outside surfaces of the subassemblies as well as preventing lateral movement of the subassembly at the point of contact.

TOP COVER

The top cover 220 provides the closure of the upper end of the reactor vessel 216 and forms the upper surface of the upper plenum 224 (Fig. 3). The twelve control rod actuators 182 operate through the top cover, and guide bearings 274 are provided in the cover for these units. The top cover also comprises the shield lid 64 which will be described hereinafter.

The top cover may be raised and lowered by two shafts 276 which penetrate the top of the reactor cell through a small rotatable plug 278 and hence may be rotated therewith when in its raised position. The top cover 220 is fastened to the reactor vessel by means of three equispaced clamping mechanisms 280 which also extend outward through the top of the reactor cell so that they may be operated therefrom. As will be seen in Fig. 3, the clamping mechanism 280 comprises a nonrotatable sleeve 282 surrounding a shaft 284. The shaft 284 is rotatable within the seat 286 and the nonrotatable sleeve 282 fits into the shaped recess 288 in the top cover. The sleeve 282 is longitudinally translatable over the shaft 284 by means of a longitudinal screw thread arrangement.

The underside of the top cover is provided with pins or projections 289 on the same spacing as the subassemblies as shown in Fig. 3. These pins are positioned directly above each fuel handling adapter 122 and provide approximately 3/16 inch clearance between the adapter 122 and the end of the pin. The pins do not make contact with the subassembly adapters but prevent any appreciable lifting of the subassemblies in the event of failure of the hydraulic holddown system. A steel thermal shield 290 is also provided on the bottom of the top cover 220.

NEUTRON SHIELD

The shield 62 (Fig. 1) is a neutron attenuating shield surrounding the outside of the reactor vessel on all sides and is submerged in the bulk sodium of the tank 34. The shielding material is graphite and graphite impregnated with 3 w/o natural boron. The shielding material is contained in stainless steel cans (not shown) which are stacked around the reactor in concentric rows. Each row is staggered with respect to adjacent rows to minimize neutron streaming between the junction of adjacent cans. The three inside rows of cans contain plain graphite, the fourth row contains borated graphite, and the fifth row contains plain graphite while the sixth row contains borated graphite. The total graphite thickness of the neutron shield 62 is 24¾ inches of which 8¼ inches is borated and 16½ inches is plain.

The bottom of the neutron attenuating shield is made up of layers of cans packed around the structural members 222 and is not shown in the drawings. The bottom shield contains five layers of cans, the first two layers of which contain plain graphite, the third layer containing borated graphite, the fourth layer containing plain graphite and the fifth layer containing borated graphite. The total graphite thickness of the bottom of the shield is 20⅝ inches of which 12⅜ inches is plain and 8¼ inches is borated. The shield lid 64 is also made up of layered cans filled with either 3% borated graphite or boron carbide. The total thickness of the shield lid is 24¾ inches.

PRIMARY COOLANT SYSTEM

The primary cooling system 291 includes the complete reactor sodium cooling system which is schematically diagrammed in Fig. 24. It consists of the two D.C. electromagnetic pumps 44 operating in parallel, the reactor 32, the auxiliary pump 292, the heat exchanger 42 and the connected piping system. The entire system is contained within the tank 34 and below the sodium liquid level therein. The location of the major components in the primary tank is relatively symmetrical, the reactor vessel being centrally located in the bottom of the primary tank and the other bulk components such as pumps, heat exchangers and connecting piping radially disposed around the reactor vessel and elevated somewhat above it.

The D.C. electromagnetic primary coolant pumps 44 draw sodium from the bulk coolant 48 through the inlet pipe 294 at a distance of approximately seven feet above the bottom of the primary tank. The D.C. pumps 44 discharge the coolant into the pipes 296 which carry it to the junctions 298 where it is separated into the high pressure and low pressure coolant systems. Pipe 300 conducts the high pressure coolant from the junction to the high pressure coolant inlet plenum 240 whereas the smaller pipe 302 conducts the low pressure primary coolant through valve 303 into the low pressure coolant inlet plenum 250. Coolant flow in all regions of the reactor is upward from the inlet plenums 240 and 250 through the fuel and blanket subassemblies. The high pressure coolant flows through the fuel subassemblies 70 and the inner blanket subassemblies 72 while the low pressure coolant flows through the tubes 252 and outer blanket subassemblies 74. The coolant from all subassemblies flows into the common upper plenum chamber 224 where it is discharged through pipe 304 and the auxiliary pump 292 to the primary heat exchanger 42. It is to be noted that the upper coolant outlet 230 is located on the opposite side of the reactor vessel from the heat exchanger 42, the connecting pipe 304 between these components describing a helix-like spiral to accommodate thermal expansion. The primary coolant flows downward through the shell side of the heat exchanger 42, exiting uniformly around the lower portion of the shell periphery into the bulk sodium of the primary tank. The heat exchanger outlet is approximately 7½ feet above the centerline of the reactor. This arrangement provides an inherently reliable natural convection cooling system for shutdown cooling in the event of operational failure of the primary pumps 44 or the auxiliary pump 292. During shutdown conditions (reactor power of 1% or less) sufficient coolant flow rate is established by thermal convection to remove fission product decay energy within established fuel alloy temperature limitations. The relative elevations of the heat exchanger and reactor insure thermal convection of the primary sodium without heat removal in the heat exchanger.

Whenever the reactor is critical, coolant is supplied by the two primary sodium D.C. electromagnetic pumps 44 operating in parallel. At 100% power operation each pump supplies the reactor with approximately 4250 gallons per minute of coolant at 57 pounds per square inch. The coolant inlet temperature is approximately 700° F. and the mixed mean coolant outlet temperature is approximately 900° F. Reactor operation is restricted to a minimum primary sodium temperature of approximately 580° F. The bulk sodium is heated to this temperature electrically by emersion heaters. Expansion of the bulk sodium between 580° F. and the 700° F. normal operating temperature changes the sodium level by approximately 4 inches. An 18 inch argon blanket is maintained between the sodium level and the primary tank cover at 700° F.

The auxiliary pump 292 is permanently positioned around the pipe 304 near the inlet to the heat exchanger 42 and operates at all times. The auxiliary pump electric power is supplied from electric rectifier units and storage batteries (not shown). The storage batteries operating in parallel with the rectifier units assure pump operation in the event of a complete power failure. During normal operation these batteries float on a line and remain fully charged at all times. In the event of a sustained power failure the pump operates until the battery is discharged which results in a gradual decay of the flow rate and an ideal transition to thermal convection. Interlocks between the auxiliary pump and reactor controls prevent reactor startup unless the pump is connected and operating with the batteries fully charged.

The primary purpose of the auxiliary pump 292 is to augment thermal convection under certain conditions of reactor shutdown. These conditions occur as the result of system malfunctions which tend to destroy the temperature distributions necessary to maintain thermal convection. The auxiliary pump insures continuity of flow under these conditions and prevents undesirable temperature transients. The auxiliary pump is a D.C. electromagnetic pump, its design capacity approximating 500 gallons per minute at 0.15 p.s.i. and 900° F. sodium temperature. There is no reduction of flow area or change of pipe geometry within the auxiliary pump in order to maintain the integrity of the piping system at the expense of auxiliary pumping efficiency.

SECONDARY COOLANT AND STEAM SYSTEMS

The secondary system is the nonradioactive sodium heat transfer loop 306 between the radioactive primary system 291 and the steam system 308 and comprises the inner tube section of the heat exchanger 42, the steam generator 310 which is located outside of the primary tank 34, the secondary system pump 312 and the associated piping. The principal function of this system is to transfer heat from the primary sodium system 291 to the steam system 308 in an efficient manner. The flow rate is approximately $2.58 \times 10^6$ pounds per hour or 6030 gallons per minute. The heat exchanger 42 inlet temperature is approximately 610° F. and the outlet temperature 880° F.

The heat from the secondary sodium is transferred to the steam in the steam cycle 308 which comprises the steam generator 310, the turbine generator 314, the condenser 316, the feed water pump 318 and the associated piping. Steam is generated at approximately 1300 p.s.i.g., 850° F., from the heat delivered by the secondary sodium system 306. At 62.5 megawatts reactor output, approximately 249,000 pounds per hour of steam will be delivered to the 20 megawatt conventional design turbine generator 314.

SHUTDOWN COOLING

Removing the fission product decay heat from the reactor fuel after shutdown involves heat removal from the reactor by the sodium flowing through the reactor and heat removal from the sodium. After reactor shutdown, coolant flow through the reactor can be maintained in any of the following ways; operation of one or both of the main pumps 44, operation of the auxiliary pump 292, or natural convection flow (with the reactor cover opened or closed). Any of these methods maintains sufficient sodium flow to remove the fission product decay heat from the reactor after shutdown.

Heat removal from the sodium leaving the reactor can be accomplished by two methods. The heat may be transferred to the sodium in the secondary system 306, or the heat can be transferred to the bulk sodium 48 in the primary tank and then removed by shutdown coolers 320. If the reactor cover is closed, coolant flow through the reactor by any of the three methods described above follows the normal circuit through the primary heat exchanger 42 to the bulk sodium. If the secondary system 306 is operating, the heat is transferred in the heat exchanger 42 to the secondary system sodium. The secondary system 306 in turn transfers heat to the steam system 308 wherein it is transferred to the atmosphere through the condenser 316.

If the secondary system is inoperative the heat is transferred to the bulk sodium in the primary tank. The heated sodium leaving the reactor is mixed with the bulk sodium by discharging from either the secondary heat exchanger or if the reactor vessel cover is raised, from the top of the reactor. The heat is then removed from the bulk sodium by the shutdown coolers 320 which in turn transfer the heat to the atmosphere through a conventional air heat exchanger (not shown). Since the primary system has a very large thermal capacity compared to the amount of fission product decay heat removed from the reactor, the temperature rise of the bulk sodium is slow, and fast response of the shutdown coolers is not necessary. It will be noted that this method of heat removal is completely independent of any external power source and that all fluid flow is due to natural convection.

The shutdown cooler 320 is an emersion type bayonet heat exchanger. Two concentric pipes 322 and 324, approximately 26 feet long, are concentrically suspended within a thimble 326. The annulus between the pipes 322 and 324 is closed at the bottom and thermally insulates the inner pipe 322 from the annulus between the outer pipe 324 and the thimble 326 to provide a greater thermal head for normal convection. A eutectic alloy of sodium and potassium (NaK) is employed as the coolant and flows downward through the inner pipe 322 and upward through the annulus between the outer pipe 324 and the thimble 326. The heat from the bulk sodium is transferred to the coolant in the annulus and is transferred through the outlet 328 to a conventional thin tube air heat exchanger (not shown). The cold NaK then flows downward into the inlet 330 of the bayonet cooler.

The shutdown coolers are provided to increase the reliability of the shutdown cooling system. Under design conditions with two coolers operating the maximum temperature rise of the bulk sodium is approximately 20° F. With one cooler operating the maximum temperature rise is approximately 90° F. fifty hours after shutdown.

PRIMARY TANK AND PRIMARY STRUCTURE

The entire nuclear reactor system including the reactor and primary coolant system, as well as the fuel handling system (to be described hereinafter) is completely or partially contained in the primary tank 34 (Fig. 1). The tank 34 is surrounded and supported by the primary structure which includes the concrete biological shield 332. The primary structure is designed to combine the necessary biological shielding as well as provide the structural support for the primary tank and nuclear reactor system. The primary structure is designed to contain an energy release equivalent to 300 pounds of TNT detonated at the center of the reactor.

The primary tank 34 is of double wall construction, 334 and 336, to provide maximum reliability of sodium containment. The space 338 between the walls is filled with an inert gas which is monitored to detect leakage through either wall. Surrounding the tank 34 is a layer of insulation 340 to minimize heat loss from the primary system. The entire primary tank 34 is constructed of type 304 stainless steel. The inner tank 334 is 26 feet in internal diameter and ½ inch thick. The outer tank wall 336 is 26 feet and 11 inches in internal diameter and also ½ inch thick. The bottom plates 342 of the primary tank 34 are each 1 inch thick and are supported by radially disposed I beams 344. The primary tank cover 346 is similarly constructed with radial beams between spaced flat circular plates. The space between the plates and the radial beams is used for shielding material and thermal insulation.

The primary structure comprises the system of steel support superstructure 348, the concrete biological shield 332 and the blast shield 350. The steel superstructure 348 comprises a series of radial beams in the cell ceiling 40 and immediately below the primary tank 34 which are interconnected by upright beams (not shown) within the concrete biological shield 332.

The blast shield 350, used to preserve the integrity of primary structure including the radial biological shield in the event of an explosion type accident in the reactor, is made up of a 2 foot thick laminated blanket of alternate layers of ½ inch thick carbon steel plates and 4 inch thick lightweight foam type concrete or glass wool. The radial biological shield 332 is constructed of ordinary concrete 6 feet thick. The concrete is reinforced with continuous hoops of reinforcing rods (not shown) in such a manner as to allow the shield to resist safely at internal pressure of 75 p.s.i.g. The biological shield is cooled by forcing air in the interstice between the primary tank 34 and the blast shield 350 so that it is maintained at essentially the ambient temperature.

THE FUEL HANDLING SYSTEM

The fuel handling procedure involves the transfer of subassemblies between the reactor 32 and a disassembly cell 352 (Fig. 1). To perform this task with minimum reactor shutdown time the subassemblies are transferred from the reactor to the storage tank 46 while they are completely submerged in the bulk sodium 48. After about 15 days when fission product decay is substantially diminished they are transferred to the disassembly cell 352.

The fuel handling system comprises a reactor gripper mechanism 354 and a holddown mechanism 356. The gripper mechanism and holddown mechanism extend through the top cover 220 of the reactor and the small rotatable plug 278, which is, in turn, eccentrically located in the large rotatable plug 358. Rotation of the two plugs 278 and 358 is employed to position the gripper mechanism over the desired location in the reactor and to position the gripper for the transfer mechanism 360 at the transfer position where it is shown in Fig. 1. The holddown mechanism 356 serves to spread the six adjacent subassemblies around the desired one to be removed to facilitate easy removal thereof by the gripper mechanism 354. It also may be raised along with the gripper mechanism so as to prevent swaying of the subassembly as the plugs are rotating to position the system at the transfer position. The gripper mechanism 354 is also rotatable about its centerline to provide the correct angular orientation of the subassembly for the transfer operation. The transfer mechanism 360 comprises a transfer arm 362 which is attached to the bottom end of a rotatable shaft 364. The shaft 364 extends through the seal bearing 366 in the primary tank cover 346 to a position above the concrete reactor cell 38 from which it is manually operable. The transfer arm 362 is rotatable through a horizontal arc from the transfer position to locate the subassembly above any one of three concentric rows of storage wells in the storage tank 46.

The storage tank 46 is a cylindrically shaped structure providing seventy storage locations in three concentric rows. The storage rack is suspended by a shaft 68 extending upwardly through the disassembly cell 352. The storage tank can be rotated as well as raised to different levels in the tank 34. An empty storage location is positioned below the subassembly which is suspended from the transfer arm 362 by rotation of the storage tank. By elevating the storage tank 46 the subassembly is inserted into a storage location. To assure proper vertical movement of the storage tank 46 a transfer indicating device 370 is used. This is a sensing rod extending vertically from the disassembly cell directly to the transfer position. It is actuated by the upper adapter 122 of the subassembly being held by the transfer arm in the event that improper rotation of the storage tank would position an already occupied storage location below the subassembly or if the storage tank lifting mechanism accidentally overtravels its correct transfer level. In either case the transfer indicating device 370 acts to operate an electrical safety stop to discontinue the raising of the tank 46. Another gripping mechanism 372 is mounted in a rotatable plug 374 in the ceiling of the disassembly cell 352 and extends into the tank 34. The rotating plug 374 positions the gripper over the selected subassembly in the storage tank and after raising the subassembly to the disassembly cell 352, rotates it to a desired location therein.

The fuel handling system described above is of the same type described in Koch et al. Patent 2,924,483.

The following Table II summarizes the essential reactor system data:

Table II

GENERAL

| | Unit of Quantity | |
|---|---|---|
| Heat output | M.W. | 62.5 |
| Gross electrical output | M.W. | 20 |
| Primary sodium temperature, to reactor | °F. | 700 |
| Primary sodium temperature, from reactor | °F. | 900 |
| Primary sodium flow rate | g.p.m. | 8,500 |
| Primary sodium maximum velocity, in core | ft./sec. | 26 |
| Primary system sodium capacity | gals. | 86,000 |
| Secondary sodium temperature, to heat exchanger | °F. | 610 |
| Secondary sodium temperature, from heat exchanger | °F. | 880 |
| Secondary sodium flow rate | g.p.m. | 6,050 |
| Steam generator—output | lb./hr. | 249,000 |
| Steam temperature | °F. | 850 |
| Steam pressure | p.s.i.g. | 1,300 |
| Feed water temperature | °F. | 550 |
| Turbine throttle conditions | lb./hr. | 201,000 |
| Steam temperature | °F. | 850 |
| Steam pressure | p.s.i.g. | 1,250 |

REACTOR DATA

| | | |
|---|---|---|
| Fuel region dimensions: | | |
| Equivalent diameter | inches | 19.04 |
| Height | do | 14.22 |
| Total volume | liters | 66.3 |
| Upper and lower blanket dimensions: | | |
| Equivalent diameter | inches | 19.04 |
| Length (each end) | do | 18 |
| Inner blanket dimensions: | | |
| Equivalent O.D. | do | 26.26 |
| Length | do | 57.32 |
| Radial thickness | do | 3.61 |
| Outer blanket dimensions: | | |
| Equivalent O.D. | do | 61.5 |
| Length | do | 57.32 |
| Radial thickness | do | 17.02 |
| Fuel region composition: | | |
| Fuel alloy | volume percent | 31.8 |
| Stainless steel (Type 304) | do | 19.5 |
| Sodium | do | 48.7 |
| Control and safety rod composition (fuel section): | | |
| Fuel alloy | do | 21.3 |
| Stainless steel (Type 304) | do | 20.8 |
| Sodium | do | 57.9 |
| Upper and lower blanket composition: | | |
| Uranium (depleted) | do | 32 |
| Stainless steel (Type 304) | do | 20.4 |
| Sodium | do | 47.6 |
| Inner and outer blanket composition: | | |
| Uranium (depleted) | do | 60 |
| Stainless steel (Type 304) | do | 17.6 |
| Sodium | do | 22.4 |
| Subassemblies: | | |
| Fuel | number | 47 |
| Control (rod and thimble) | do | 12 |
| Safety (rod and thimble) | do | 2 |
| Inner blanket | do | 66 |
| Outer blanket | do | 510 |
| Total | do | 637 |

Table II—Continued

| Subassemblies:—Continued | Unit of Quantity | |
|---|---|---|
| Configuration | | Hexagonal |
| Dimension across flats | inches | 2.290 |
| Hexagonal tube thickness | do | 0.040 |
| Structural material | | 304 SS |
| Lattice spacing (pitch) | inches | 2.320 |
| Clearance between subassemblies | do | 0.030 |
| Fuel elements (pin type, sodium bonded): | | |
| Fuel pin diameter | do | 0.144 |
| Fuel pin length | do | 14.22 |
| Fuel tube O.D | do | 0.174 |
| Fuel tube wall thickness | do | 0.009 |
| Thickness Na bond annulus | do | 0.006 |
| Elements per subassembly | number | 91 |
| Upper and lower blanket elements (pin type, sodium bonded): | | |
| Blanket pin diameter | inches | 0.3165 |
| Blanket pin length (total) | do | 18 |
| Blanket tube O.D | do | 0.376 |
| Blanket tube wall thickness | do | 0.022 |
| Thickness Na bond annulus | do | 0.008 |
| Blanket elements per subassembly (each end) | number | 19 |
| Control and safety subassemblies: | | |
| Configuration | | Hexagonal |
| Dimension across flats | inches | 1.908 |
| Fuel elements | | Same as core subassembly |
| Fuel elements/rod | number | 61 |
| Inner and outer blanket elements (pin type, sodium bonded): | | |
| Blanket pin diameter | inches | 0.0433 |
| Blanket pin length (total) | do | 55 |
| Blanket tube O.D | do | 0.493 |
| Blanket tube wall thickness | do | 0.018 |
| Thickness Na bond annulus | do | 0.012 |
| Blanket elements per subassembly | number | 19 |
| Fuel alloy (enriched U-fissium): | | |
| Total core loading | kg | 363 |
| $U^{235}$ enrichment | Percent | 49 |
| Critical mass—$U^{235}$ | kg | 170 |
| Fissium composition: | | |
| Uranium | weight percent | 95.0 |
| Zirconium | do | 0.2 |
| Molybdenum | do | 2.5 |
| Ruthenium | do | 1.5 |
| Rhodium | do | 0.3 |
| Palladium | do | 0.5 |
| Fertile blanket material | | Depleted uranium |
| Total blanket loading | kg | 28,100 |
| $U^{235}$ enrichment | Percent | 0.4 |

NUCLEAR DATA

| | | |
|---|---|---|
| Total fissions per cc./sec., at center of core | number | $4.4 \times 10^{13}$ |
| Neutron energy distribution at center of core: | | |
| Flux above 1.35 mev | n/cm.$^2$/sec | $0.8 \times 10^{15}$ |
| Flux below 1.35 mev | n/cm.$^2$/sec | $2.9 \times 10^{15}$ |
| Total neutron flux | n/cm.$^2$/sec | $3.7 \times 10^{15}$ |
| Prompt neutron life time | seconds | $8 \times 10^{-8}$ |

REACTOR CONTROL

| | | |
|---|---|---|
| Power coefficients: | | |
| 0—22.5 M.W | $\Delta k/k$/M.W | $-3.2 \times 10^{-4}$ |
| 22.5–62.5 M.W | $\Delta k/k$/M.W | $-6.0 \times 10^{-4}$ |
| Doppler effect—average | $\Delta k/k$/°C | $+0.02 \times 10^{-3}$ |
| Isothermal temperature coefficient | $\Delta k/k$/°C | $-3.6 \times 10^{-3}$ |
| Total reactivity: | | |
| 12 control rods | $\Delta k/k$ | 0.05 |
| 2 safety rods | $\Delta k/k$ | 0.015–0.020 |
| Control subassemblies | number | 12 |
| Operating drives | each rod | rack and pinion |
| Velocity | in./min | 5 |
| Total movement | inches | 14 |
| Scram drive | | Pneumatic |
| Safety subassemblies | number | 2 |
| Operating drive | | Rack and pinion |
| Velocity | in./min | 2 |
| Total movement | inches | 14 |
| Scram drive | | Gravity |
| Long-term reactivity effects (from clean to 2% burnup): | | |
| Burnup of $U^{235}$ in core | $\Delta k/k$ | $-.011$ |
| Buildup of Pu in core | $\Delta k/k$ | $+.002$ |
| Buildup of Pu in blanket | $\Delta k/k$ | $+.0072$ |
| Buildup of fission products | $\Delta k/k$ | $-.002$ |
| Irradiation growth of fuel (4% growth) | $\Delta k/k$ | $-.011$ |

HEAT TRANSFER

| | | |
|---|---|---|
| Heat generation in reactor: | | |
| Fuel, control and safety subassemblies | M.W | 53.3 |
| Upper and lower blanket | M.W | 1.2 |
| Inner blanket | M.W | 5.2 |
| Outer blanket | M.W | 2.6 |
| Neutron shield | M.W | 0.2 |
| Heat generation in core: | | |
| Radial maximum to average power density at reactor center plane | ratio | 1.33 |
| Axial maximum to average power density at reactor center line | do | 1.17 |
| Power density, average | M.W./l | 0.91 |
| Power density, maximum | M.W./l | 1.37 |
| Power density, maximum to average | ratio | 1.51 |
| Specific power | M.W./kg | 0.314 |
| Fuel elements, surface area | sq. ft | 231 |
| Control elements, surface area (in active zone) | sq. ft | 32.4 |
| Safety elements, surface area | sq. ft | 6.6 |
| Total | sq. ft | 270 |
| Maximum heat flux | B.t.u./ft.$^2$/hr | 1,030,000 |
| Average heat flux | B.t.u./ft.$^2$/hr | 680,000 |

FUEL SUBASSEMBLY BOWING EFFECT

As was hereinbefore discussed, the bowing characteristics of the fuel subassemblies in the core section of the reactor is of importance because of the resulting change in the effective core radius and therefore in reactivity. Bowing of the subassembly is caused by the existence of a temperature differential across its opposite sides or flats. The temperature differential is effected primarily as a result of the nonuniform radial distribution of heat generation within the subassembly and secondarily by the unequal rates of heat transfer from the opposite flats of the subassembly under consideration to the subassemblies of the adjacent rows. The sign of the temperature differential always is such as to tend to produce a concave curvature in the subassembly towards the core center so that the core radius at the center portion of the fuel region tends to diminish. Comparative magnitudes of the temperature differentials effected in subassemblies of various core rows are such that the amount of curvature tends to become progressively greater with increase in row number or distance from core center. Increasing temperature differentials in any part of the core section may be effected by increases in operating power level, clogged coolant channels and other reasons.

The neutronic reactor hereinbefore described has been designed to eliminate this shrinking of the central core radius and actually cause the radius to increase with increasing temperature differentials therein. As previously stated, all subassemblies within the core section 52 are identical in size and shape. Each subassembly is essentially hexagonal in shape, the distance across outside flats being 2.290 inches. The center-to-center spacing of the subassemblies is 2.320 inches, the resulting nominal clearance between flats of adjacent assemblies being 0.030 inch. Each fuel subassembly 70 as well as each inner blanket subassembly 72 is provided with a button 126 on each of its six flats, positioned so that it lies in a horizontal plane 1.00 inch above the fuel centerline. These buttons protrude a nominal 0.014 inch from the subassembly flats and are 0.50 inch in diameter. The dimension across opposite button flats of each subassembly is held to 2.318±0.002 inch. The resulting nominal clearance between button flats of adjacent subassemblies is 0.002 inch.

The fuel and inner blanket subassemblies 70 and 72, respectively, are positioned and supported in the reactor by their lower adapters 128 and 150 respectively, the ends of which pass through the apertures 129 in the upper grid plate 130 and engage in the axially aligned apertures 129a in the lower grid plate 132. The portion 270 of the adapter which rests on the upper plate is of the shape of a truncated sphere and the upper edge of the plate hole 258 on which the adapter rests is conically chamfered. This arrangement provides a continuous line contact for subassembly support. Thus lateral movement of the upper part of the subassembly or of the lower end of the adapter is accommodated by pivoting of the subassembly about this line of contact; i.e. lateral movement of the subassembly in the region of contact with the upper plate is restricted. This does not occur unless a very large force is applied. Consequently, application of lateral force in or above the region of the fuel region 56 produces only a pivoting of the subassembly until the lower end of the adapter closes the lower plate hole clearance (0.0042 inch radially) and thereafter results in bending of the assembly. Lateral movement of the top end of the subassembly is restricted to a nominal displacement of 0.030 inch when contact with the adjacent subassembly is made, unless the adjacent subassembly also undergoes displacement, in which case the restriction is not effected until after correspondingly greater displacement.

In considering the effect on the core diameter, it will be noted that the temperature difference ΔT across each subassembly increases with the distance of the subassembly from the core center. Consequently, while all subassemblies bow in the same direction, they bow in varying degree. Therefore, in considering the effect upon the core diameter it is reasonable to base all bowing analysis on the action of the outer or fifth row subassembly only.

Figure 25:
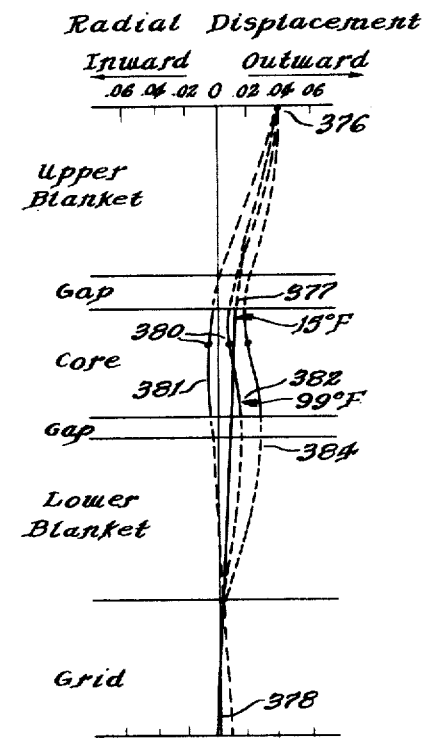
Fig. 25 is a diagrammatic curve illustrating the bowing effects of a subassembly subjected to different temperature differentials assuming the most pessimistic initial conditions.
Figure 26:
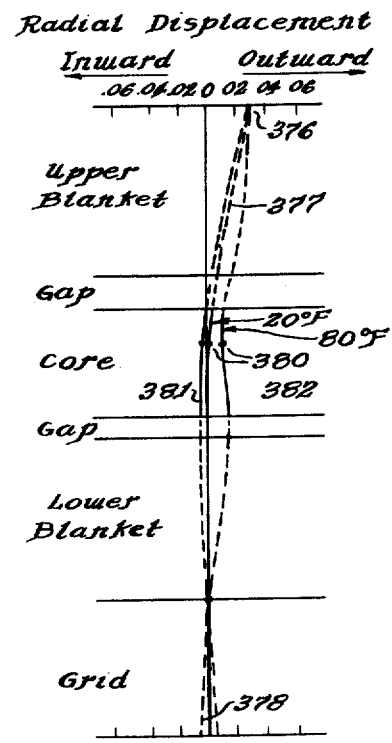
Fig. 26 is a diagrammatic curve illustrating the bowing effects of a subassembly subjected to different temperature differentials assuming the most probable initial conditions.

The following qualitative analysis may best be understood with reference to Figs. 25 and 26. For convenience in discussion the effective ΔT magnitude is indicated in terms of maximum ΔT along the vertical direction of the assembly or $\Delta T_m$. As a small $\Delta T_m$ is effected across the subassembly, all of the subassembly above the lower part of the core section starts to bow radially outward thus increasing the effective core radius. As the $\Delta T_m$ is increased the amount of outward displacement increases until the top end of the subassembly contacts the top of the adjacent subassembly indicated on Figs. 25 and 26 by the numeral 376. It will be noted that at this temperature differential indicated by the curves marked 377 in Figs. 25 and 26, the location of the button 126 is insufficient to produce button contact with an adjacent subassembly. Further increase in $\Delta T_m$ results in additional bowing but because the top end of this subassembly is now prevented from moving outward this bowing effects a radially inward movement of the core section. At the same time, the subassembly proceeds to pivot causing the lower end of the adapter 378 to move outward until it closes the lower plate hole clearance. As the increase in $\Delta T_m$ continues, the inward movement of the core section continues until the subassembly button contacts the button of the subassembly in the next or fourth row indicated by the numeral 380 in Figs. 25 and 26. Bowing during this period obviously tends to decrease the effective core diameter as may be seen by the curves 381. Additional increase in $\Delta T_m$ beyond this point continues to increase the bowing but does not move the core section further inward because of the button restriction. In fact, such an increase in $\Delta T_m$ is accompanied by increasing subassembly temperature in the button region. The increase in subassembly temperature causes a radial thermal expansion of the subassembly increasing the distance across button flats. The cumulative effect of all subassemblies expanding, results in an outward movement of the periphery at the vertical center portion of the core section. This condition is represented by the curves 382 and 384 in Figs. 25 and 26. To summarize the entire action, as $\Delta T_m$ is continuously increased from 0, change in effective core radius is initially increasing, then slightly decreasing and finally increasing again.

Fig. 25 represents the bowing characteristics of the fifth row subassembly for the most pessimistic initial position, which includes the following conditions:

(1) The core subassemblies are splayed outward; i.e. each assembly except the center one is pivoted from its normal upright position as far as the nominal clearance of the lower plate holes will permit.

(2) The dimension across opposite button flats of each subassembly is 0.002 inch less than the design nominal.

(3) The upper and lower grid plate holes of the fifth row are located at a radius 0.002 inch greater than the design radius.

(4) The subassemblies are straight.

These assumptions result in an initial total clearance between subassembly buttons of 0.026 inch. Consequently there exists 0.026 inch of radial gap potentially available for reduction of core radius in the plane of the buttons. It is also assumed that the maximum free displacement of the top end of the subassembly is 0.022 inch.

Fig. 26 diagrams the bowing characteristics of a fifth row core subassembly in which the most probable disposition of the subassembly is assumed. In this case:

(1) The core subassemblies are vertical.

(2) The dimension across opposite button flats of each assembly is the design nominal dimension.

(3) The upper and lower plate holes of the fifth row are located at the design radius.

(4) The subassemblies are straight.

These assumptions result in an initial total clearance between subassembly buttons of 0.008 inch. In this case, the maximum free displacement of the top end of the subassembly is taken as the nominal clearance between subassemblies of 0.030 inch.

Figure 27:
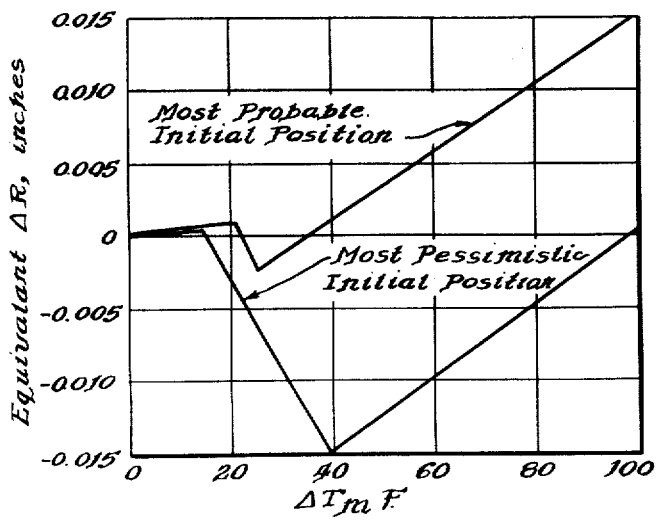
Fig. 27 is a curve showing the effect of varying core temperature differentials on the effective radius of the core.

By weighting, in accordance with the square of the local neutron flux or power density, the local radial displacement from its intial position of every point in the core section, an equivalent change in core radius, with respect to reactivity effect, can be determined for every value of $\Delta T_m$. This equivalent change in core radius represents that axially uniform change in core radius which would produce approximately the same change in reactivity as the nonuniform change effected by bowing. Fig. 27 shows the equivalent change in core radius as a function of $\Delta T_m$ for both the most pessimistic and most probable initial position conditions. It shows that in both cases the effective core radius first increases, then decreases and finally increases with a continuously increasing $\Delta T_m$. It will be noted in Fig. 27 that the maximum reduction in equivalent core radius during heating of the reactor which might be expected is 0.016 inch. The maximum reduction in equivalent core radius which should normally be expected during heating of the reactor core is of the order of 0.002 inch. The reduction in core diameter occurs only over a very short range of temperature differentials and the resulting increases in reactivity are easily controlled by the control devices of the reactor.

While the foregoing description of the invention describes a particular reactor in detail it is not intended that the scope of the invention be limited, except insofar as set forth in the following claims.

What is claimed is:

1. A fast neutron liquid cooled reactor comprising a reactor vessel, a core section centrally located within said vessel, a radial blanket section surrounding the core section, an upper grid plate and lower grid plate laterally disposed in said vessel and spaced from one another, said grid plates each having axially aligned confronting apertures therein, each aperture in the upper grid plate being conically chamfered at its upper end, said core and blanket sections comprising vertically extending multifaced subassemblies packed together, each having a lower extension adapted to engage a pair of said aligned apertures in said grid plates to support said assembly, said extension having a spherically shaped surface at its upper end adapted to engage the conical chamfer in the upper grid plate and fitting snugly within the aperture in the lower grid plate, and a protuberance in the vertical mid-portion of each face of each core section subassembly adapted to engage the protuberance on its adjacent subassembly.

2. A fast neutron liquid cooled reactor comprising a vessel, a core section centrally disposed in the vessel, a blanket section radially surrounding the core section, an upper and a lower grid plate disposed laterally across the vessel in its bottom portion, said plates each having a plurality of equispaced apertures therein, each of the apertures in the upper plate being axially aligned with an aperture in the lower plate, each of the apertures in the upper plate having a conical seat at its upper ends, said core section and said blanket section each comprising a plurality of vertically extending hexagonal subassemblies having lower extensions adapted to engage aligned apertures in said upper and lower grid plates, each of said extensions having at its upper end a spherically shaped surface to cooperate with said conical seat to prevent lateral movement of the subassembly thereat, a protuberance on each face of each subassembly in the core section, said protuberance disposed in the vertical mid-portion of each of said faces of the core section subassemblies and adapted to engage a protuberance on an adjacent subassembly, means for introducing a liquid coolant into the subassemblies through their extensions, means for extracting the coolant from the tops of the subassemblies, and means controlling the amount of coolant flow through each core section subassembly dependent on its position with respect to the center of the core section.

3. A fast neutron liquid cooled reactor comprising a vessel, a core section centrally disposed in the vessel, a blanket section radially surrounding the core section, an upper and a lower grid plate disposed laterally across the vessel in its bottom portion, said plates each having a plurality of equispaced apertures therein, each of the apertures in the upper plate being axially aligned with an aperture in the lower plate, each of the apertures in the upper plate having a conical seat at its upper ends, said core section and said blanket section each comprising a plurality of vertically extending hexagonal subassemblies having lower extensions adapted to engage aligned apertures in said upper and lower grid plates, each of said extensions having at its upper end a spherically shaped surface to cooperate with said conical seat to prevent lateral movement of the subassembly thereat, each of said extensions having at its lower end a close tolerance fit within the aperture in said lower grid plate a protuberance on each face of each subassembly in the core section, said protuberance disposed in the vertical mid-portion of each of said faces of the core section subassemblies and adapted to engage a protuberance on an adjacent subassembly, said lower extension of each core section subassembly having at least one longitudinally extending aperture therein for passing coolant to the interior of said subassemblies, the lower grid plate having a stepped upper surface so that said plate is thinner at the center of the core section than at its outer edge, said stepped surface and said longitudinal apertures in said extensions cooperating to cause a greater flow of coolant through the subassemblies in the center of the core section than around its outer edge.

4. A fast neutron liquid cooled reactor comprising a vessel, a core section centrally disposed in the vessel, a blanket section radially surrounding the core section, an upper and a lower grid plate disposed laterally across the vessel in its bottom portion, said plates each having a plurality of equispaced apertures therein, each of the apertures in the upper plate being axially aligned with an aperture in the lower plate, each of the apertures in the upper plate having a conical seat at its upper ends, said core section and said blanket section each comprising a plurality of vertically extending hexagonal subassemblies packed 2.320 inches between centers, each of said subassemblies measuring 2.290 inches across opposite flats and having lower extensions adapted to engage the aligned apertures in said upper and lower grid plates, each of said extensions having at its upper end a spherically shaped surface to cooperate with said conical seat to prevent lateral movement of the subassembly thereat, each of said subassemblies fitting at its lower end within the corresponding aperture in said lower grid plate with a radial clearance of .0042 inch the subassemblies in the core section describing a fuel region containing 393 kilograms of 49% enriched uranium, said fuel region having an effective diameter of 19.04 inches and a height of 14.22 inches, a button protruding 0.014 inch on each face of each subassembly in the core section, said button disposed approximately 1.00 inch above the vertical mid-portion of said fuel region and adapted to engage a button on an adjacent subassembly, means for introducing a liquid coolant into the subassemblies through their extensions, means for extracting the coolant from the tops of the subassemblies, and means controlling the amount of coolant flow through each core section subassembly dependent on its position with respect to the center of core section.

5. A liquid cooled reactor comprising a reactor vessel, a core section centrally located within said vessel, an upper grid plate and lower grid plate laterally disposed in said vessel and spaced from one another, said grid plates each having axially aligned confronting apertures therein, each aperture in the upper grid plate being conically chamfered at its upper end, said core section comprising vertically extending multifaced subassemblies packed together, each having a lower extension adapted to engage a pair of said aligned apertures in said grid plates to support said assembly, said extension having a spherically shaped surface at its upper end adapted to engage the conical chamfer in the upper grid plate and a protuberance in the vertical mid-portion of each face of each core section subassembly adapted to engage the protuberance on its adjacent subassembly.

6. A fast neutron liquid cooled reactor comprising a vessel, a core section centrally disposed in the vessel, an upper and a lower grid plate disposed laterally across the vessel in its bottom portion, said plates each having a plurality of equispaced apertures therein, each of the apertures in the upper plate being axially aligned with an aperture in the lower plate, each of the apertures in the upper plate having a conical seat at its upper ends, said core section comprising a plurality of vertically extending hexagonal subassemblies having lower extensions adapted to engage aligned apertures in said upper and lower grid plates, each of said extensions having at its upper end a spherically shaped surface to cooperate with said conical seat to prevent lateral movement of the subassembly thereat, a protuberance on each face of each subassembly in the core section, said protuberance disposed in the vertical mid-portion of each of said faces of the core section subassemblies and adapted to engage a protuberance on an adjacent subassembly.

References Cited in the file of this patent

UNITED STATES PATENTS

| 2,503,270 | Hickman | Apr. 11, 1950 |
| 2,780,596 | Anderson | Feb. 5, 1957 |
| 2,824,056 | Leverett | Feb. 18, 1958 |

FOREIGN PATENTS

| 768,078 | Great Britain | Feb. 13, 1957 |

OTHER REFERENCES

Barnes et al.: "International Conference on the Peaceful Uses of Atomic Energy," vol. 3, pages 330–344, August 1955, U.N. publication, New York.